(12) United States Patent
Nasu et al.

(10) Patent No.: US 11,263,107 B2
(45) Date of Patent: Mar. 1, 2022

(54) APPLICATION DEVELOPMENT SUPPORT SYSTEM AND APPLICATION DEVELOPMENT SUPPORT METHOD

(71) Applicant: Hitachi, Ltd., Tokyo (JP)

(72) Inventors: Hiroshi Nasu, Tokyo (JP); Keisuke Hatasaki, Tokyo (JP); Soichi Takashige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/022,234

(22) Filed: Sep. 16, 2020

(65) Prior Publication Data

US 2021/0294597 A1 Sep. 23, 2021

(30) Foreign Application Priority Data

Mar. 18, 2020 (JP) .............................. JP2020-047644

(51) Int. Cl.

| | |
|---|---|
| *G06F 9/44* | (2018.01) |
| *G06F 11/34* | (2006.01) |
| *G06F 8/71* | (2018.01) |
| *G06F 8/77* | (2018.01) |
| *G06F 9/54* | (2006.01) |
| *G06F 9/46* | (2006.01) |
| *G06F 8/41* | (2018.01) |
| *G06F 8/20* | (2018.01) |
| *G06Q 10/06* | (2012.01) |

(52) U.S. Cl.
CPC ............ *G06F 11/3409* (2013.01); *G06F 8/24* (2013.01); *G06F 8/41* (2013.01); *G06F 8/71* (2013.01); *G06F 8/77* (2013.01); *G06F 9/46* (2013.01); *G06F 9/542* (2013.01); *G06Q 10/067* (2013.01)

(58) Field of Classification Search
CPC .......... G06F 11/3409; G06F 8/41; G06F 8/24; G06F 9/46; G06F 8/71; G06F 8/77; G06F 9/542; G06Q 10/067
See application file for complete search history.

(56) References Cited

U.S. PATENT DOCUMENTS

| | | | | |
|---|---|---|---|---|
| 2006/0005193 | A1* | 1/2006 | Illowsky ................... | G06F 8/24 718/100 |
| 2016/0063401 | A1* | 3/2016 | Stachel ................ | G06Q 10/067 705/7.23 |

(Continued)

*Primary Examiner* — Tuan A Vu
(74) *Attorney, Agent, or Firm* — Baker Botts L.L.P.

(57) ABSTRACT

Provided is an application development support system and method that support studies on applying serverless while optimizing application resource usage amount and maintaining API response performance in developing an application with microservices. In the application development support system, a container runtime platform applies serverless to a certain container to form an event-driven container. The application development support system executes an API processing time prediction process by calculating a predicted value of API processing time in the event-driven container and a predicted value of API processing time in all of the containers based on the predicted value and a sequence of API calls among the plurality of containers; calculating a usage amount of resources used by the plurality of containers per unit period; and outputting a calculated result of each of the API processing time prediction processing and the resource usage amount calculation processing.

10 Claims, 20 Drawing Sheets

(56) References Cited

U.S. PATENT DOCUMENTS

2016/0378545 A1* 12/2016 Ho ............................ G06F 9/46
                                                         718/107
2018/0322437 A1* 11/2018 Mcclory ................... G06F 8/41
2019/0205186 A1    7/2019 Zhang et al.
2021/0263779 A1*  8/2021 Haghighat .......... G06F 11/3409

* cited by examiner

FIG. 5

CONTAINER TABLE  225

| CONTAINER ID | CONTAINER IMAGE ID | CONTAINER NAME | CONTAINER BOOT STATE | CONTAINER BOOT TIME | EVENT-DRIVEN | CONTAINER SURVIVAL TIME |
|---|---|---|---|---|---|---|
| abc123 | … | … | running | … | false | … |
| efg456 | … | … | running | … | true | … |
| … | … | … | … | … | … | … |
| 2251 | 2252 | 2253 | 2254 | 2255 | 2256 | 2257 |

FIG. 6

CONTAINER RUNTIME PLATFORM RESOURCE TABLE  226

| NAMESPACE NAME | SERVICE NAME | CONTAINER GROUP NAME | CONTAINER ID | CONTAINER IMAGE ID |
|---|---|---|---|---|
| … | … | … | … | … |
| … | … | … | … | … |
| … | … | … | … | … |
| 2261 | 2262 | 2263 | 2264 | 2265 |

FIG. 7

EVENT-DRIVEN CONTAINER SETTING TABLE  227

| CONTAINER SURVIVAL TIME INITIAL VALUE | CONTAINER SURVIVAL TIME LOWER THRESHOLD | CONTAINER SURVIVAL TIME UPPER THRESHOLD | CONTAINER SURVIVAL TIME INCREASE AND REDUCTION UNIT | CONTAINER BOOT COUNT LOWER THRESHOLD | CONTAINER BOOT COUNT UPPER THRESHOLD |
|---|---|---|---|---|---|
| … | … | … | … | … | … |
| 2271 | 2272 | 2273 | 2274 | 2275 | 2276 |

| CONTAINER API CALL LOG FILE | | | | | | |
|---|---|---|---|---|---|---|
| TIME POINT | SERVICE ID | API | REQUEST/ RESPONSE | REQUEST ID | SPAN ID | PARENT SPAN ID |
| ... | ... | GET / | request | ... | ... | ... |
| ... | ... | POST / | request | ... | ... | ... |
| ... | ... | ... | ... | ... | ... | ... |

| EVENT-DRIVEN CONTAINER BOOT/DELETION LOG FILE | | | | |
|---|---|---|---|---|
| TIME POINT | SERVICE ID | CONTAINER ID | CONTAINER IMAGE ID | CONTAINER BOOT/ DELETION |
| ... | ... | ... | ... | BOOT |
| ... | ... | ... | ... | DELETION |
| ... | ... | ... | ... | ... |

| CONTAINER IMAGE TABLE | | | |
|---|---|---|---|
| PATH | CONTAINER IMAGE ID | tag | ... |
| node-red/node-red-docker | ... | {latest, v0.1.5} | ... |
| nginx | ... | {} | ... |
| ... | ... | ... | ... |

3221  3222  3223

APPLICATION DEVELOPMENT SUPPORT SYSTEM AND APPLICATION DEVELOPMENT SUPPORT METHOD

BACKGROUND OF THE INVENTION

1. Field of the Invention

The present invention relates to an application development support system and an application development support method, and is suitably applied to an application development support system and an application development support method that provide support when serverless is utilized in development of application software (hereinafter, referred to as an application) configured with microservices.

2. Description of the Related Art

In the development of an application configured with microservices, serverless (or Function as a Service (Faas)) is widely used in order to improve efficiency of application resource utilization. The serverless is a mechanism of an application execution environment in which computing resources such as a CPU and a memory are ensured to dynamically boot a server as needed in response to a predetermined event such as an application programming interface (API) call of an application without constantly booting a server resource for executing an application.

In the related art, it is known that resource usage costs and operation costs can be reduced since not only a resource amount used by an application configured with microservices is reduced but also constant management and constant monitoring of resources are eliminated by applying serverless in an execution environment (a container) of the application (US Patent Application Publication Number 2019/0205186).

However, when serverless is applied in the execution environment of the application configured with microservices, a reduction in the resource amount used by the application can be expected as described above. On the other hand, API response performance may be reduced as follows. That is, when serverless is applied, the application can respond to an API only after a server resource is ensured by driving a container in response to a predetermined event (hereinafter, referred to event driving). Therefore, time required for responding to an API call is delayed by time required for ensuring a resource. As a result, a performance requirement of the API call may not be satisfied.

Therefore, when an application developer intends to apply serverless, the application developer has to determine whether serverless can be applied while considering optimizing a usage amount of an application resource and maintaining API response performance. It is not easy to make such a determination.

SUMMARY OF THE INVENTION

The invention has been made in view of the above circumstances and proposes an application development support system and an application development support method that can support studies on whether serverless can be applied while considering optimizing an application resource usage amount and maintaining API response performance in development of an application configured with microservices.

In order to solve the problems described above, the invention provides an application development support system that supports development of application software configured with a plurality of containers in a system the executes the application software. The application development support system includes a container runtime platform that provides resources for the plurality of containers and has a function of applying serverless to a certain container of the plurality of containers to form an event-driven container. A processor of the container runtime platform executes a program so as to perform: an API processing time prediction processing of calculating a predicted value of API processing time required from when the event-driven container receives an API call to when the event-driven container responds with an API response, and calculating a predicted value of API processing time in all of the plurality of containers based on the calculated predicted value and a sequence of API calls among the plurality of containers; a resource usage amount calculation processing of calculating a usage amount of resources used by the plurality of containers per predetermined unit period; an API processing time output processing of outputting the predicted value of API processing time in all of the plurality of containers that is calculated by the API processing time prediction processing; and a resource usage amount output processing of outputting the usage amount of the resources used by the plurality of containers that is calculated by the resource usage amount calculation processing.

In order to solve the problems described above, the invention provides an application development support method for a system that executes application software configured with a plurality of containers and includes a container runtime platform that provides resources for the plurality of containers and has a function of applying serverless to a certain container of the plurality of containers to form an event-driven container. The application development support method includes an API processing time prediction step of calculating a predicted value of API processing time required from when the event-driven container receives an API call to when the event-driven container responds with an API response, and calculating a predicted value of API processing time in all of the plurality of containers based on the calculated predicted value and a sequence of API calls among the plurality of containers; a resource usage amount calculation step of calculating a usage amount of resources used by the plurality of containers per predetermined unit period; an API processing time output step of outputting the predicted value of API processing time in all of the plurality of containers that is calculated in the API processing time prediction step; and a resource usage amount output step of outputting the usage amount of the resources used by the plurality of containers that is calculated in the resource usage amount calculation step.

According to the invention, it is possible to support studies on whether serverless can be applied while considering optimizing an application resource usage amount and maintaining API response performance in development of an application configured with microservices.

BRIEF DESCRIPTION OF THE DRAWINGS

FIG. 5 is a diagram showing an example of a container table 225.

FIG. 6 is a diagram showing an example of a container runtime platform resource table 226.

FIG. 7 is a diagram showing an example of an event-driven container setting table 227.

FIG. 8 is a diagram showing an example of a container API call log file 2310.

FIG. 9 is a diagram showing an example of an event-driven container boot/deletion log file 2320.

FIG. 10 is a diagram showing an example of a container image table 322.

DESCRIPTION OF THE PREFERRED EMBODIMENTS

Figure 1:
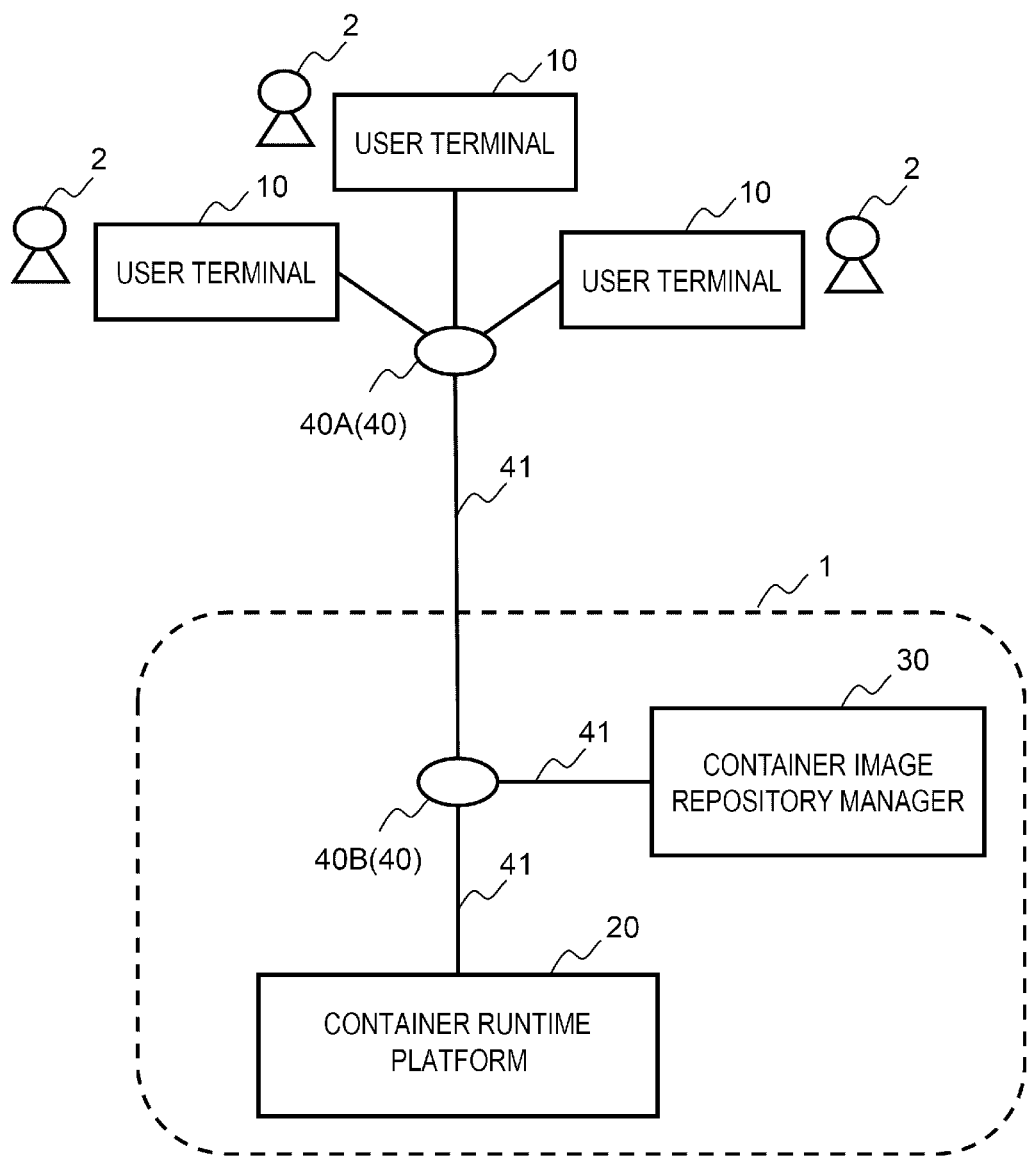
FIG. 1 is a block diagram showing a configuration example of an entire system including an application development support system 1 according to an embodiment of the invention.

In the following description, an "interface device" refers to one or more interface devices. The "one or more interface devices" may be at least anyone of an input and output (I/O) interface device and a communication interface device which will be described below.

The I/O interface device is an interface device for at least one of an I/O device and a remote display computer. The I/O interface device for a display computer may be a communication interface device. At least one I/O device may be any one of a user interface device (for example, an input device such as a keyboard and a pointing device) and an output device such as a display device.

The communication interface device may be one or communication interface devices of the same type (for example, may be one or more network interface card (NIC)), or two or more communication interface devices of different types (for example, an NIC and a host bus adapter (HBA)).

In the following description, a "memory" refers to one or more memory devices, and typically may be a main storage device. At least one memory device in the memory may be a volatile memory device or a non-volatile memory device.

In the following description, a "persistent storage device" refers to one or more persistent storage devices. Typically, the persistent storage device is a non-volatile storage device (for example, an auxiliary storage device). Specific examples of the persistent storage device(s) include a hard disk drive (HDD) and a solid state drive (SSD).

In the following description, a "storage device" may be either the "memory" or the "persistent storage device".

In the following description, a "processor" refers to one or more processor devices. Typically, at least one processor device is a microprocessor device such as a central processing unit (CPU). Alternatively, the processor device may be another type of processor device such as a graphics processing unit (GPU). The at least one processor device may be a single core or a multi-core. Alternatively, the at least one processor device may be a processor core. Alternatively, the at least one processor device may be a processor device in a broad sense such as a hardware circuit (for example, a field-programmable gate array (FPGA) or an application specific integrated circuit (ASIC)) that executes a part of or all processings.

In the following description, an expression such as "xxx table" may be used to describe information that is acquired as an output for an input. Alternatively, the information may be data of any structure, or may be a learning model such as a neural network that generates an output for an input. Therefore, the "xxx table" can be referred to as "xxx information". In the following description, a configuration of each table is an example, one table may be divided into two or more tables, and all or a part of the two or more tables may be one table.

In the following description, a processing may be described using a "program" as a subject, but the program is executed by a processor so as to perform a predetermined processing by appropriately using a storage device and/or an interface device, and therefore, a subject of the processing may be a processor (or a device such as a controller having the processor). The program may be installed from a program source into a device such as a computer. The program source may be, for example, a program distribution server or a recording medium (for example, a non-transitory recording medium) that can be read by a computer. In the following description, two or more programs may be implemented as one program, or one program may be implemented as two or more programs.

In the following description, an expression such as "xxx unit" may be used to describe a function. Alternatively, the function may be implemented by a processor executing one or more computer programs, or may be implemented by one or more hardware circuits (for example, an FPGA or an ASIC). When the function is implemented by a processor executing a program, a predetermined processing is executed by appropriately using a storage device and/or an interface device, so that the function may be at least a part of the processor. A processing described using the function as a subject may be a processing executed by a processor or by a device including the processor. Alternatively, the program may be installed from a program source. The program source may be, for example, a recording medium (for example, a non-transitory recording medium) that can be read by a program distribution computer or a computer. A description for each function is an example, and a plurality of functions may be combined into one function, or one function may be divided into a plurality of functions.

In the following description, a "computer system" is a system including one or more physical computers. The physical computer may be a general-purpose computer or a dedicated computer.

Hereinafter, an embodiment of the invention will be described in detail with reference to drawings.

(1) System Configuration

FIG. 1 is a block diagram showing a configuration example of an entire system including an application development support system 1 according to an embodiment of the invention. As shown in FIG. 1, the entire system has a configuration in which user terminals 10, a container runtime platform 20, and a container image repository manager 30 are connected to networks 41 that are concentrated by network switches 40 (individually, for example, network switches 40A and 40B). The application development support system 1 according to the present embodiment mainly includes the container runtime platform 20 and the container image repository manager 30. Alternatively, the application development support system 1 may include the user terminals 10.

The user terminals 10 are computers operated by users 2. A graphical user interface (GUI) provided by the container runtime platform 20 is displayed on a web browser (see a web browser 122 in FIG. 2) operated on the user terminal 10, and the user 2 checks information or updates information about the GUI.

The container runtime platform 20 is a computer (server) having a function of executing a container and having a serverless function of booting a container by event driving and executing automatic container deletion to automatically delete a container.

Figure 11:
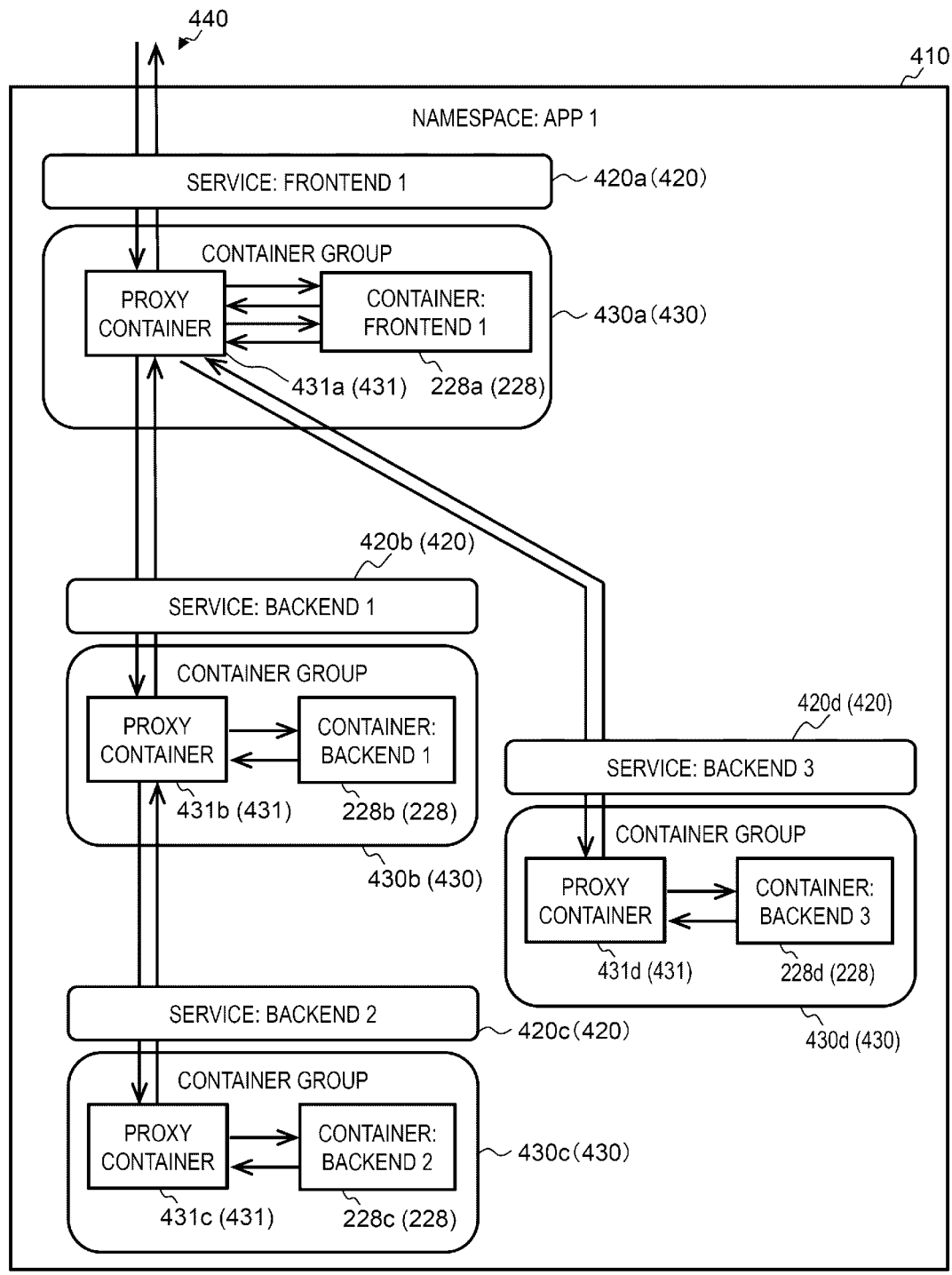
FIG. 11 is a diagram showing a configuration example of resources related to containers of an application 1.

In the present embodiment, a resource of the container runtime platform 20 is used to provide an execution environment (container) for an application configured with individually independent microservices (hereinafter, simply referred to as "services"). A specific example of a microservice configuration of the application is shown in FIG. 11 which will be described later. The container runtime platform 20 has the serverless function described above, so that serverless can be applied to the container. In response to an event (for example, an API call), the container to which serverless is applied is driven (event-driven) after a server resource is ensured. In the present embodiment, a container that is event-driven is referred to as an event-driven container.

The container image repository manager 30 is a computer having a function of managing a container image of a container executed by the container runtime platform 20. The container image repository manager is also referred to as a container registry.

The network switch 40 is a switch of the networks 41 to which the user terminals 10, the container runtime platform 20, and the container image repository manager 30 are connected. A specific example of the network switch 40 includes a switch in a local network (for example, a local area network (LAN)).

Figure 2:
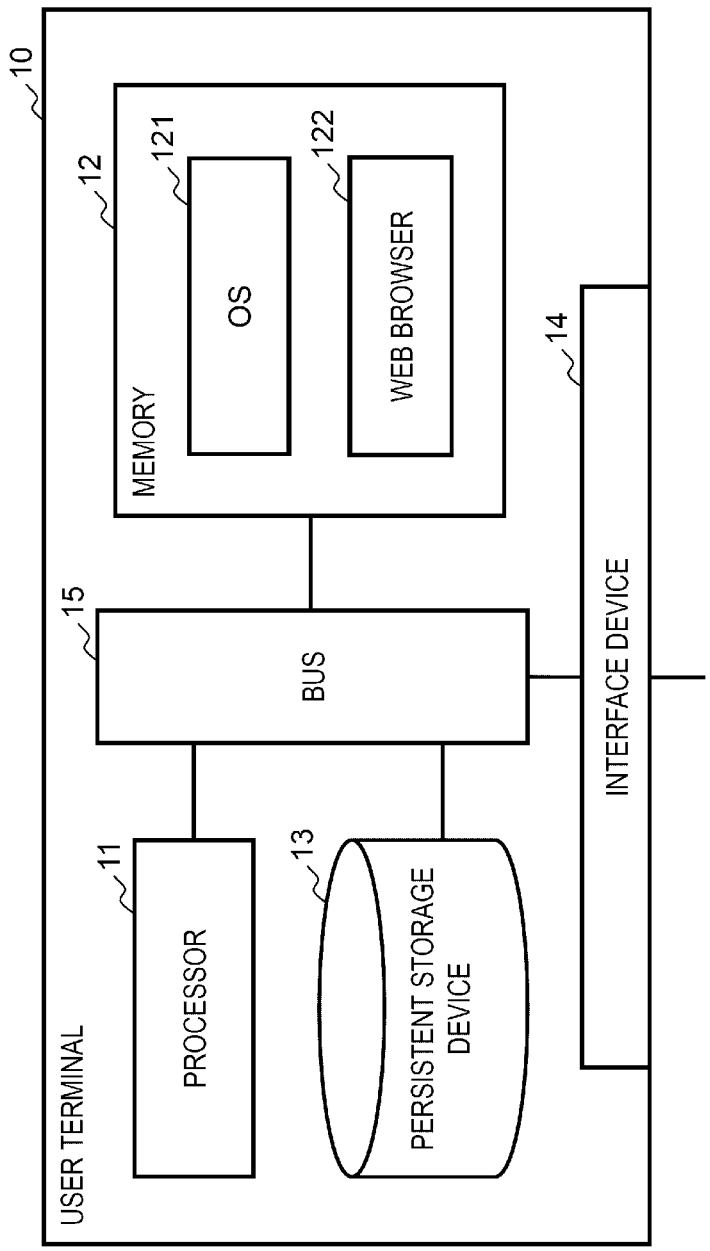
FIG. 2 is a block diagram showing a configuration example of a user terminal 10.

FIG. 2 is a block diagram showing a configuration example of the user terminal 10. The user terminal 10 shown in FIG. 2 includes a processor 11, a memory 12, a persistent storage device 13, an interface device 14, and a bus 15 that connects the components described above.

Figure 3:
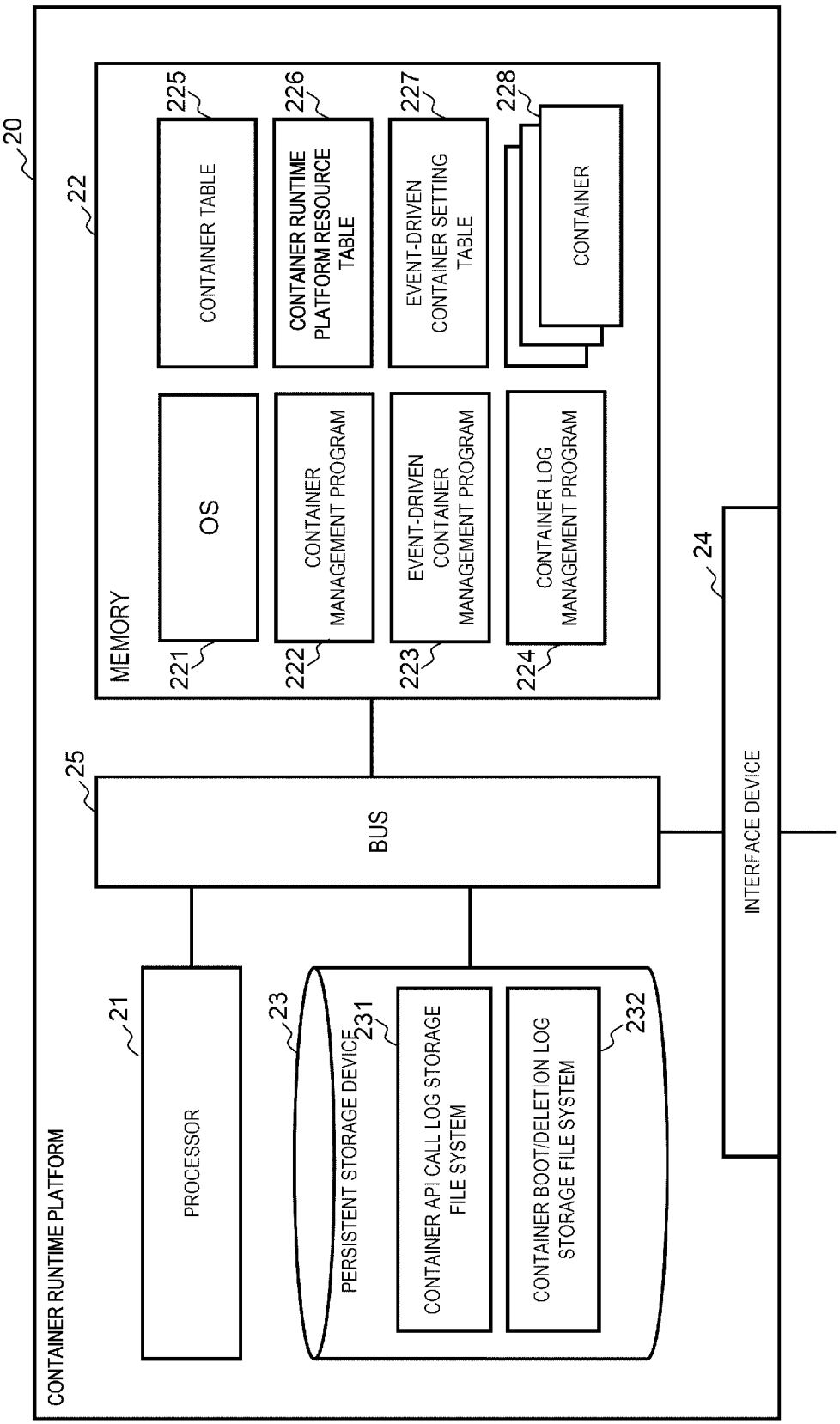
FIG. 3 is a block diagram showing a configuration example of a container runtime platform 20.

FIG. 3 is a block diagram showing a configuration example of the container runtime platform 20. The container runtime platform 20 shown in FIG. 3 includes a processor 21, a memory 22, a persistent storage device 23, an interface device 24, and a bus 25 that connects the components described above.

Figure 4:
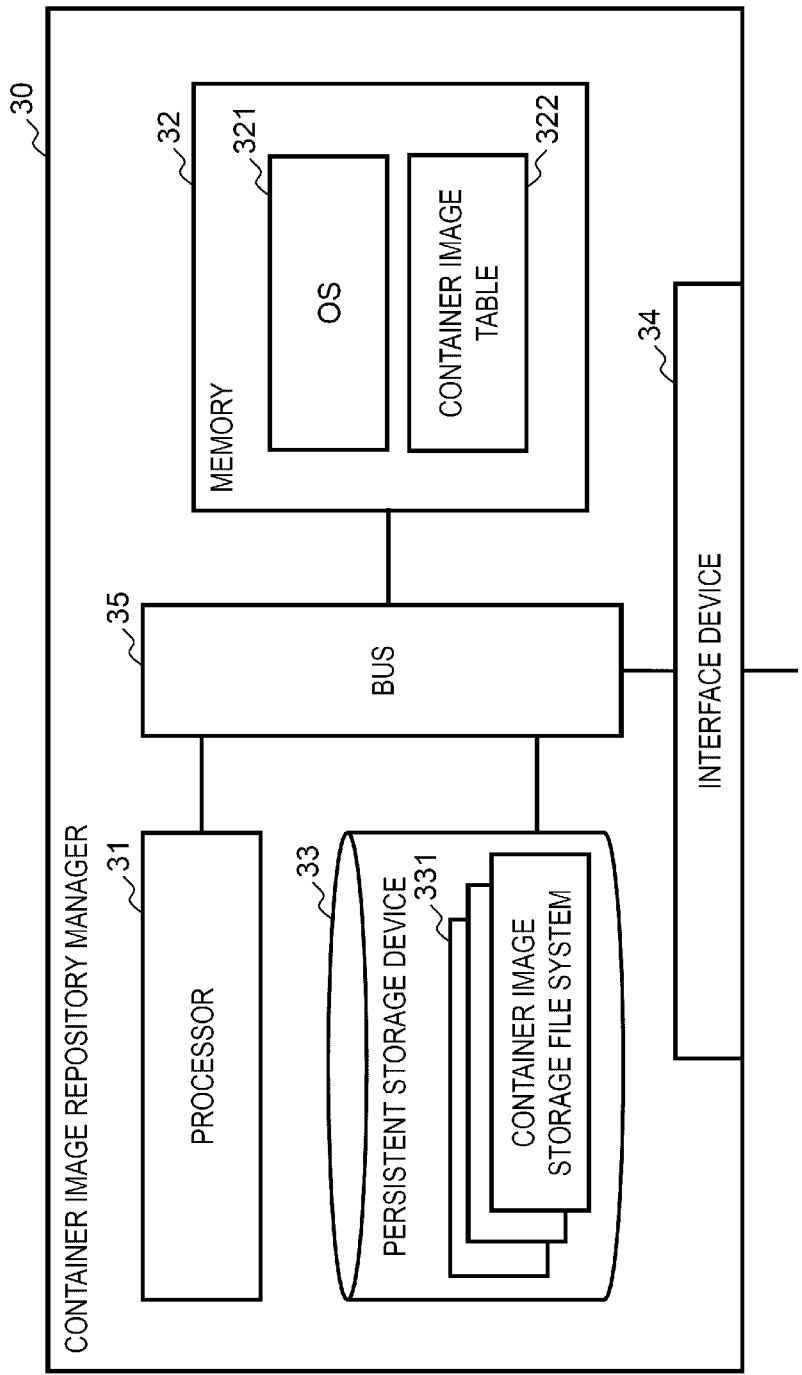
FIG. 4 is a block diagram showing a configuration example of a container image repository manager 30.

FIG. 4 is a block diagram showing a configuration example of the container image repository manager 30. The container image repository manager 30 shown in FIG. 4 includes a processor 31, a memory 32, a persistent storage device 33, an interface device 34, and a bus 35 that connects the components described above.

In FIGS. 2 to 4, although shown by different reference numbers, a processor, a memory, a persistent storage device, an interface device, and a bus are shown as a common configuration for each of the user terminal 10, the container runtime platform 20, and the container image repository manager 30. The processor, the memory, the persistent storage device, the interface device, and the bus may be considered as similar physical devices in the user terminal 10, the container runtime platform 20, and the container image repository manager 30.

For example, in the user terminal 10, the processor 11 implements a predetermined function by executing a program stored in the memory 12. The memory 12 stores a program to be executed by the processor 11 and data necessary for the execution of the program. The program is loaded from the persistent storage device 13 into the memory 12. The interface device 14 is connected to the network switch 40 (40A). The user terminal 10 having such a configuration can communicate with other computers in the system via the interface device 14.

FIGS. 2 to 4 show a hardware configuration example of each node when each of the user terminal, the container runtime platform, and the container image repository manager is implemented by a physical computer. However, not all of the computers have to be necessarily implemented by physical computers, and at least part of the computers may be replaced with a virtual environment such as a virtual machine or a container.

(2) Program and Data

As shown in FIGS. 2 to 4, the user terminal 10, the container runtime platform 20, and the container image repository manager 30 store different programs or data in respective memories or persistent storage devices. Hereinafter, a characteristic program or data stored in each node will be described.

(2-1) Program and Data in User Terminal 10

As shown in FIG. 2, the memory 12 of the user terminal 10 stores an operating system (OS) 121 and the web browser 122.

(2-2) Program and Data in Container Runtime Platform 20

As shown in FIG. 3, the memory 22 of the container runtime platform 20 stores an OS 221, a container management program 222, an event-driven container management program 223, a container log management program 224, a container table 225, a container runtime platform resource table 226, an event-driven container setting table 227, and a plurality of containers 228. The persistent storage device 23 of the container runtime platform 20 stores a container API call log storage file system 231 and a container boot/deletion log storage file system 232.

The container management program 222 is a program that performs general management related to the containers 228, such as boot of the containers 228.

The event-driven container management program 223 is a program that manages event driving of the containers 228.

The container log management program 224 is a program that manages a recorded log related to the containers 228, and, for example, records a log of calling a file system stored in the persistent storage device 23.

FIG. 5 is a diagram showing an example of the container table 225. The container table 225 is a table that manages information related to the containers 228, and includes an entry for each of the containers 228. In FIG. 5, the container table 225 includes data items of a container ID column 2251, a container image ID column 2252, a container name column 2253, a container boot state column 2254, a container boot time column 2255, an event-driven column 2256, and a container survival time column 2257.

The data items in the container table 225 will be described. The container ID column 2251 stores an identifier (container ID) capable of identifying the container 228. The container image ID column 2252 stores an identifier (container image ID) capable of identifying a container image of the container 228. The container name column 2253 stores a name of the container 228. The container boot state column 2254 stores a boot state of the container 228. For example, when the container 228 is booted, "running" is recorded in the container boot state column 2254. The container boot time column 2255 stores time required to boot the container 228 (container boot time). The event-driven column 2256 stores information indicating whether the container 228 is a serverless application (event-driven) target. For example, when serverless is applied to the container 228, "true" is recorded in the event-driven column 2256, and when serverless is not applied to the container 228, "false" is recorded in the event-driven column 2256. The container survival time column 2257 stores survival time of the container 228 (container survival time). The container survival time is time set to determine deletion of a booted container. An initial value of the container survival time is predetermined. The container survival time is represented by, for example, a period of time starting from a final API request (or an API response) after a container is booted.

FIG. 6 is a diagram showing an example of the container runtime platform resource table 226. The container runtime platform resource table 226 is a table that manages information related to resources associated with the containers 228 of the container runtime platform 20, and includes an entry for each of the containers 228. In FIG. 6, the container runtime platform resource table 226 includes data items of a namespace name column 2261, a service name column 2262, a container group name column 2263, a container ID column 2264, and a container image ID column 2265.

The data items in the container runtime platform resource table 226 will be described. The namespace name column 2261 stores a namespace name that defines a group for all resources. The service name column 2262 stores a service name that defines an access point to the container 228. The container group name column 2263 stores a container group name that defines a group of the containers 228. The container ID column 2264 stores a container ID of the container 228. The container image ID column 2265 stores a container image ID of the container 228.

FIG. 7 is a diagram showing an example of the event-driven container setting table 227. The event-driven container setting table 227 is a table that manages set values related to an event-driven container. In FIG. 7, the event-driven container setting table 227 includes data items of a container survival time initial value column 2271, a container survival time lower threshold column 2272, a container survival time upper threshold column 2273, a container survival time increase and reduction unit column 2274, a container boot count lower threshold column 2275, and a container boot count upper threshold column 2276.

The data items in the event-driven container setting table 227 will be described. The container survival time initial value column 2271 stores an initial value of container survival time. The container survival time lower threshold column 2272 stores lower threshold time of the container survival time. The container survival time upper threshold column 2273 stores upper threshold time of the container survival time. The container survival time increase and reduction unit column 2274 stores increase and reduction unit time of the container survival time. The container boot count lower threshold column 2275 stores a lower threshold count of a container boot count. The container boot count upper threshold column 2276 stores an upper threshold count of a container boot count. Values of items in the event-driven container setting table 227 are defined in advance and are commonly applied to all of the containers 228.

The container 228 is an execution environment of an application configured with microservices, and one or more containers 228 are present for each of the microservices constituting the application. A specific example of a microservice configuration of the application is shown in FIG. 11 which will be described later. When a serverless function is not applied, the container 228 is constantly booted to allocate resources of the container runtime platform 20. When a serverless function is applied, the container 228 is booted (event-driven) to allocate resources of the container runtime platform 20 in response to an event (for example, an API call). As described above, the container 228 that is event-driven is referred to as an event-driven container.

The container API call log storage file system 231 is a file system that records a log related to API calls of the containers 228. In the present embodiment, when an API call of the container 228 is executed, the event-driven container management program 223 calls the container API call log storage file system 231 to record a log, thereby generating or updating the container API call log file 2310 (see FIG. 8) in the persistent storage device 23.

FIG. 8 is a diagram showing an example of the container API call log file 2310. The container API call log file 2310 is a file that records a log of API calls of the containers 228, and has an entry for each history of the API calls. In FIG. 8, the container API call log file 2310 includes data items of a time point column 2311, a service ID column 2312, an API column 2313, a request/response column 2314, a request ID column 2315, a Span ID column 2316, and a parent Span ID column 2317.

The data items in the container API call log file 2310 will be described. The time column 2311 stores information about a time point when an API is called. The service ID column 2312 stores an identifier (service ID) capable of identifying a service serving as an endpoint of an API call destination. The API column 2313 stores an API method and a uniform resource identifier (URI). The request/response column 2314 stores information indicating whether a type of an API is a request or a response. The request ID column

2315 stores a request ID serving as an identifier of an API request. The Span ID column 2316 stores an identifier (Span ID) that identifies a processing of an API request. The parent Span ID column 2317 stores a Span ID (parent Span ID) that identifies a processing of an API caller.

The container boot/deletion log storage file system. 232 is a file system that records a log related to the container 228 that is event-driven (an event-driven container). In the present embodiment, when an event-driven container is booted or deleted (or when boot or deletion is confirmed), the container log management program 224 calls the container boot/deletion log storage file system 232 to record a log, thereby generating or updating the event-driven container boot/deletion log file 2320 (see FIG. 9) in the persistent storage device 23.

FIG. 9 is a diagram showing an example of the event-driven container boot/deletion log file 2320. The event-driven container boot/deletion log file 2320 is a file that records a log of boot or deletion of an event-driven container, and has an entry for each history of boot or deletion of the event-driven container. In FIG. 9, the event-driven container boot/deletion log file 2320 includes data items of a time point column 2321, a service ID column 2322, a container ID column 2323, a container image ID column 2324, and a container boot/deletion column 2325.

The data items in the event-driven container boot/deletion log file 2320 will be described. The time point column 2321 stores information about a time point when the event-driven container is booted or deleted. The service ID column 2322 stores a service ID of a service serving as an endpoint of the event-driven container. The container ID column 2323 stores a container ID of the event-driven container. The container image ID column 2324 stores a container image ID of the event-driven container. The container boot/deletion column 2325 stores information indicating whether an operation executed by the event-driven container is boot or deletion.

(2-3) Program and Data in Container Image Repository Manager 30

As shown in FIG. 4, the memory 32 of the container image repository manager 30 stores an OS 321 and a container image table 322. In addition to an entity of a container image, the persistent storage device 33 of the container image repository manager 30 stores container image storage file systems 331.

FIG. 10 is a diagram showing an example of the container image table 322. The container image table 322 is a table that manages information of container images stored in the persistent storage device 33, and has an entry for each of the container images. In FIG. 10, the container image table 322 includes data items of a path column 3221, a container image ID column 3222, and a tag column 3223.

The data items in the container image table 322 will be described. The path column 3221 stores name information of a container image. The container image ID column 3222 stores a container image ID of the container image. The tag column 3223 stores an array of meta information of the container image.

(3) Microservice Configuration of Application

In the present embodiment, the container runtime platform 20 and the container image repository manager 30 having the configurations described above provide an application execution environment in the container 228 configured with microservices. Further, for such an application execution environment (container), the application development support system 1 according to the present embodiment can calculate a predicted value of API response performance (API processing time) when serverless is applied, and can further calculate application resource usage amounts before and after the application of serverless.

FIG. 11 is a diagram showing a configuration example of resources related to containers of an application 1. In FIG. 11, four containers 228 (individually, containers 288a to 228d) are shown as execution environments of one application configured with microservices. In FIG. 11, all resources related to the containers 228 of the application 1 are represented by a namespace 410. The namespace 410 includes a service 420, a container group 430, the container 228, and the like.

The namespace 410 indicates a group of resources, and is assigned with a name "app 1" in the present example.

The service 420 (individually, services 420a to 420d) serves as an endpoint when each of the containers 228 is accessed, and is assigned with the same name ("frontend 1", "backend 1", "backend 2", and "backend 3") as the container 228 of an access destination in the present example.

The container group 430 is a group of containers 228 in units of microservices, and each container group includes a proxy container 431 and the container 228. Individually, a container group 430a includes a proxy container 431a and a container 228a, a container group 430b includes a proxy container 431b and a container 228b, a container group 430c includes a proxy container 431c and a container 228c, and a container group 430d includes a proxy container 431d and a container 228d.

The container 228 in each container group 430 performs communication 440 with components outside the corresponding container group 430 via the proxy container 431 in the same container group 430. Each proxy container 431 manages communication with the container 228, and executes, for example, an API request header processing (see FIG. 12) which will be described later.

In FIG. 11, it is assumed that the communication 440 starts from communication from outside of the container runtime platform 20 to the frontend container 228a, and thereafter the communication is executed in order of a communication from the container 228a to the container 228b, a communication from the container 228b to the container 228c, and a communication from the container 228a to the container 228d. However, a resource configuration and a path of the communication 440 shown in FIG. 11 are merely examples, and the present embodiment is not limited thereto. For example, the number of container groups 430 may not be four, a plurality of containers 228 may be included in one container group 430, or a path of the communication 440 in the namespace 410 may be different from that in FIG. 11.

(4) Processing

Processing executed by the application development support system 1 according to the present embodiment will be described in detail. In the following description, a resource configuration of the container 228 of an application is assumed to be the resource configuration shown in FIG. 11.

(4-1) API Request Header Processing

Figure 12:
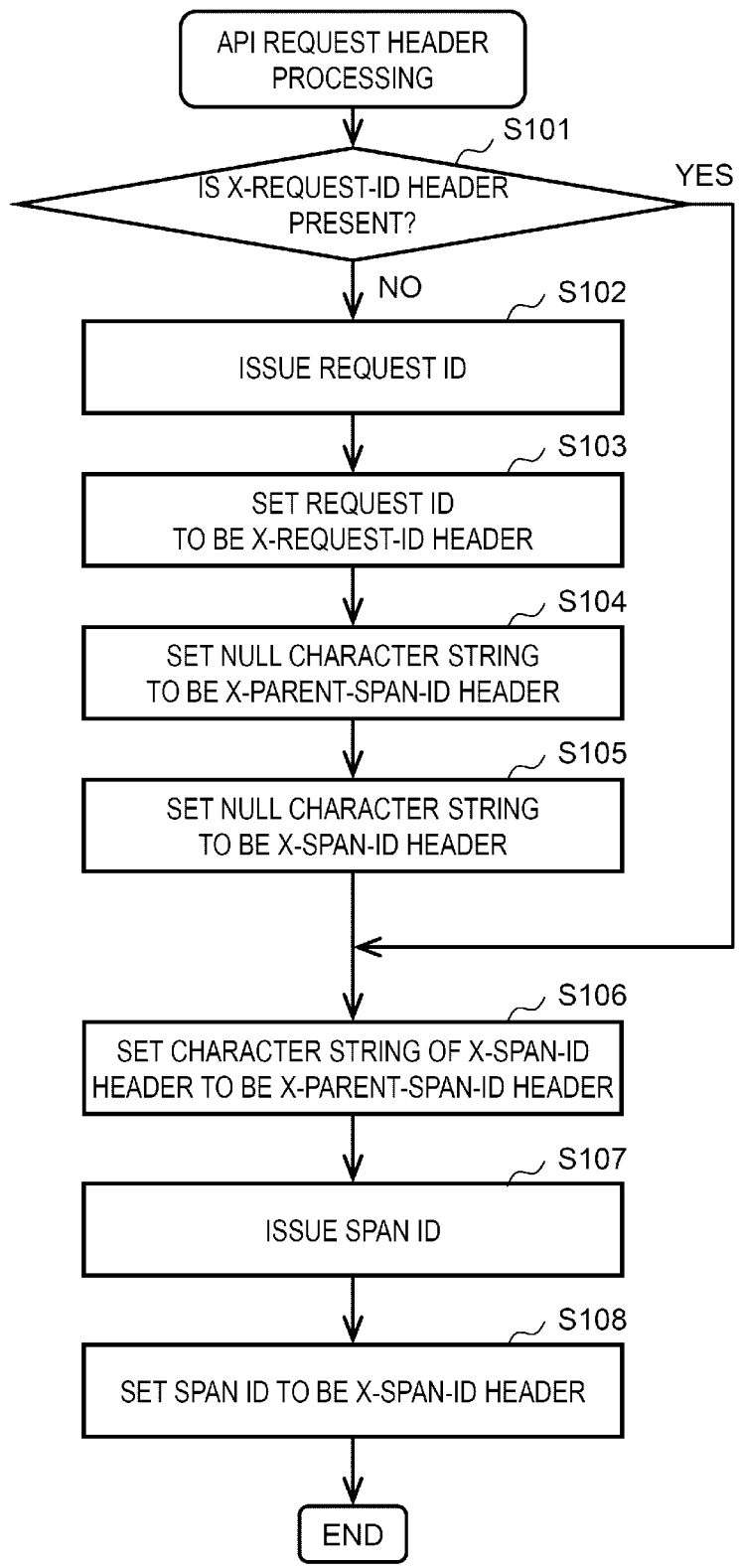
FIG. 12 is a flowchart showing a processing procedure example of an API request header processing.

FIG. 12 is a flowchart showing a processing procedure example of an API request header processing. The API request header processing is a processing of giving header information for analyzing an API call log to an API request, and is executed by the proxy container 431 of the container runtime platform 20. The API request header processing is executed at timing independent of other processings which will be described later. Specific headers given in the API request header processing include an "X-REQUEST-ID" header for setting a request ID that identifies each API request, an "X-SPAN-ID" header for setting a Span ID that identifies a processing of each API request, and an "X-PARENT-SPAN-ID" header for setting a parent Span ID that identifies a processing of a caller of each API request.

According to FIG. 12, first, the proxy container 431 checks whether a received API request header includes the "X-REQUEST-ID" header (step S101). When the "X-REQUEST-ID" header is included (YES in step S101), the processing proceeds to step S106, and when the "X-REQUEST-ID" header is not included (NO in step S101), the processing proceeds to step S102.

In step S102, the proxy container 431 issues a request ID for identifying an API request with a globally unique ID such as a universally unique identifier (UUID).

Next, the proxy container 431 sets the request ID issued in step S102 to be the "X-REQUEST-ID" header (step S103), sets a null character string to be the "X-PARENT-SPAN-ID" header (step S104), and sets a null character string to be the "X-SPAN-ID" header (step S105).

In step S106, the proxy container 431 sets the character string that was set to be the "X-SPAN-ID" header to be the "X-PARENT-SPAN-ID" header. When a processing in step S106 is performed in a case of NO in step S101, the processing may proceed to step S107 without any special processing since a null character string is set to be the "X-PARENT-SPAN-ID" header and the "X-SPAN-ID" header by the processings in step S104 and step S105 that are executed before step S106.

Next, the proxy container 431 issues a Span ID with a globally unique ID such as a UUID (step S107).

Next, the proxy container 431 sets the Span ID issued in step S107 to be the "X-SPAN-ID" header (step S108), and ends the API request header processing.

(4-2) Event-Driven Container Boot Processing

Figure 13:
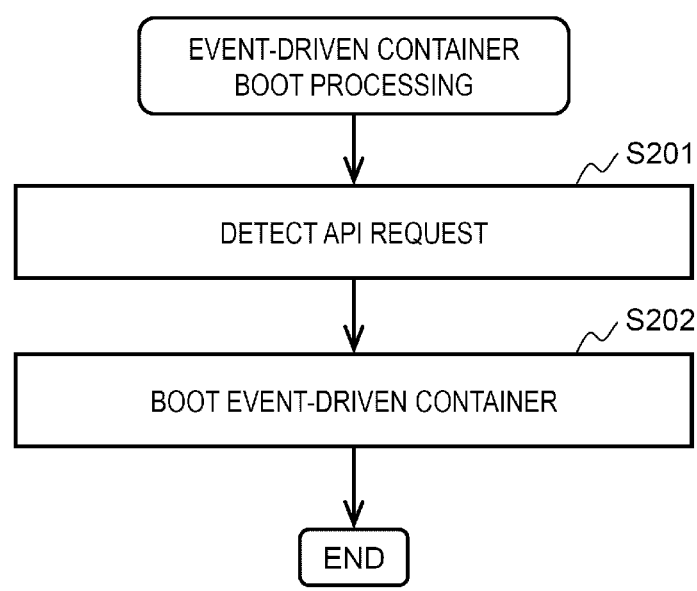
FIG. 13 is a flowchart showing a processing procedure example of an event-driven container boot processing.

FIG. 13 is a flowchart showing a processing step procedure of an event-driven container boot processing. The event-driven container boot processing is a processing of booting a container (an event-driven container) to which serverless is applied in response to an API request event, and is executed by the event-driven container management program 223.

According to FIG. 13, first, the event-driven container management program 223 detects an API request (step S201).

Next, for the container 228 that is a destination of the API request detected in step S201, the event-driven container management program 223 ensures a server resource for the container 228 in the container runtime platform 20, and then boots the container 228 (step S202), and ends the event-driven container boot processing. The event-driven container responds to an API call by returning an API response after the server resource is ensured by event driving.

(4-3) Event-Driven Container Deletion Processing

Figure 14:
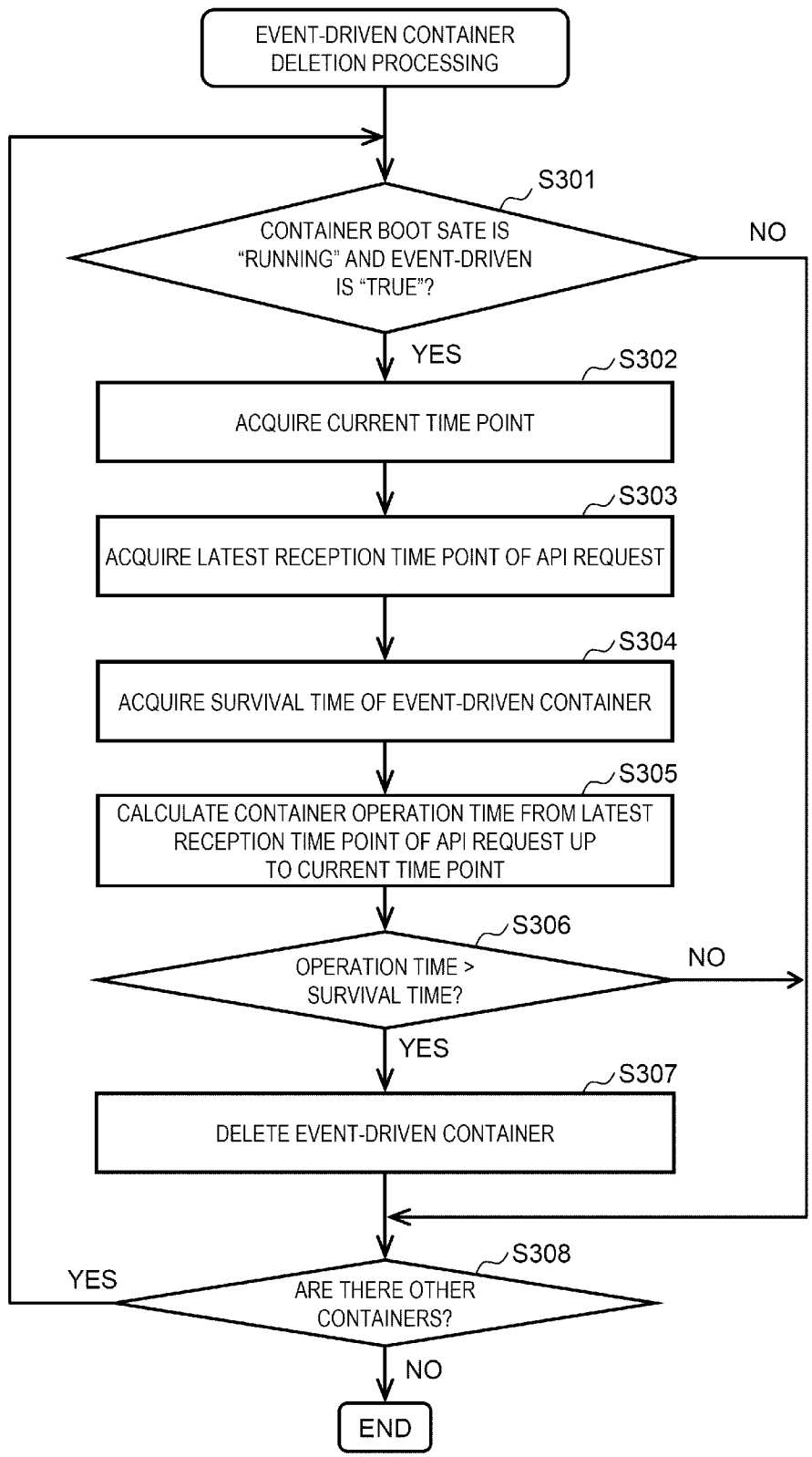
FIG. 14 is a flowchart showing a processing procedure example of an event-driven container deletion processing.

FIG. 14 is a flowchart showing a processing procedure example of an event-driven container deletion processing. The event-driven container deletion processing is a processing of deleting an event-driven container booted by event driving, and is executed by the event-driven container management program 223.

According to FIG. 14, first, the event-driven container management program 223 selects one container 228 (hereinafter, referred to as the container in the present processing) from a plurality of containers 228 managed by the container table 225, and determines whether the container is an event-driven container during boot (step S301). Specifically, the event-driven container management program 223 determines whether a recorded content in the container boot state column 2254 is "running" and a recorded content in the event-driven column 2256 is "true" in an entry of the container table 225 corresponding to the container. Here, "running" in the container boot state column 2254 refers to that the container is during boot, and "true" in the event-driven column 2256 refers to that the container is a serverless application target, that is, an event target container.

When the two determination criteria described above are satisfied in step S301, the event-driven container management program 223 determines that the container is an event-driven container during boot (YES in step S301), and proceeds to a processing in step S302. On the other hand, when at least one of the two determination criteria described above is not satisfied in step S301, the event-driven container management program 223 determines that the container is not an event-driven container during boot (NO in step S301), and proceeds to a processing in step S308.

In step S302, the event-driven container management program 223 acquires a current time point.

Next, the event-driven container management program 223 acquires a latest reception time point of an API request in the container (step S303). The latest reception time point of the API request can be acquired from a recorded content in the time column 2311 of the container API call log file 2310 (See FIG. 8).

Next, the event-driven container management program 223 acquires survival time of the event-driven container (step S304). The survival time of the event-driven container can be acquired from a recorded content in the container survival time initial value column 2271 of the event-driven container setting table 227.

Next, the event-driven container management program 223 calculates a period of time (container operation time) from the latest reception time point of the API request acquired in step S303 up to the current time point acquired in step S302 (step S305).

Next, the event-driven container management program 223 determines whether the container operation time (operation time) calculated in step S305 is longer than the survival time of the event-driven container (survival time) acquired in step S304 (step S306). When the operation time is longer than the survival time (YES in step S306), the event-driven container management program 223 proceeds to step S307, and when the operation time is equal to or shorter than the survival time (NO in step S306), the event-driven container management program 223 skips step S307 and proceeds to step S308.

In step S307, the event-driven container management program 223 deletes the container since it is confirmed that the operation time of the container is longer than the survival time according to the determination in step S306, and proceeds to step S308.

In step S308, the event-driven container management program. 223 checks whether there is the container 228 in which the processings in steps S301 to S307 are not performed among the plurality of containers 228 managed by the container table 225. When there are unprocessed containers 228 (YES in step S308), the event-driven container management program 223 selects one container 228 from the unprocessed containers 228, and repeats the processings starting from step S301. On the other hand, when all of the containers 228 are processed (NO in step S308), the event-driven container management program 223 ends the event-driven container deletion processing.

(4-4) Event-Driven Container API Processing Time Prediction Processing

Figure 15:
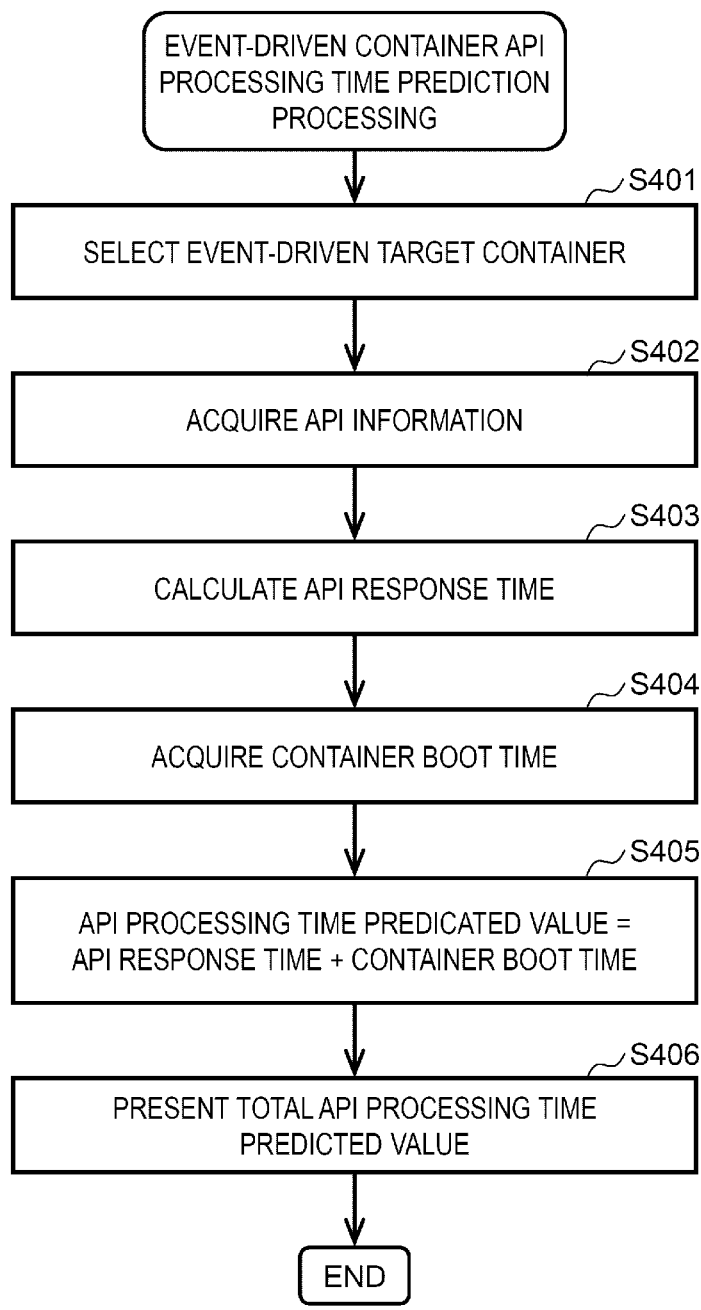
FIG. 15 is a flowchart showing a processing procedure example of an event-driven container API processing time prediction processing.

FIG. 15 is a flowchart showing a processing procedure example of an event-driven container API processing time prediction processing. The event-driven container API processing time prediction processing is a processing of calculating a predicted value (an API processing time predicted value) of API processing time required from when an event-driven container receives an API call to when the event-driven container responds by returning an API response, and calculating a predicted value (a total API processing time predicted value) of API processing time in all containers constituting an application. The event-driven container API processing time prediction processing is executed by the event-driven container management program 223.

The event-driven container API processing time prediction processing is started when any one of the containers is selected by a user as an event-driven target in API processing time display screens (see FIGS. 23 and 24) which will be described later, specifically, when a checkbox of "serverless application" is checked.

According to FIG. 15, first, the event-driven container management program 223 selects a container (hereinafter, referred to as a target container) as an event-driven target (step S401).

Next, the event-driven container management program. 223 acquires API information about an API that calls the target container (step S402). The API information can be acquired from a recorded content in the API column 2313 of an entry including a service ID (the service ID column 2312) corresponding to the target container by searching the entry in the container API call log file 2310.

Next, for the API whose API information is acquired in step S402, the event-driven container management program 223 calculates response time (API response time) required from when the target container receives an API request to when the target container returns an API response (step S403). For the same piece of API information in the entry of the container API call log file 2310 that is searched in step S402, the API response time can be calculated by subtracting time (in time column 2311) in an entry in which "request" is recorded in the request/response column 2314 from time (in the time column 2311) in an entry in which "response" is recorded in the request/response column 2314. Since no server resource is allocated until the event-driven container is booted by event driving, the event-driven container cannot receive an API request or transmit an API response.

Next, the event-driven container management program. 223 acquires container boot time of the target container (step S404). The container boot time can be acquired from a recorded content in the container boot time column 2255 of the container table 225.

Next, the event-driven container management program. 223 calculates a predicted value of API processing time required from when an API is called to when the target container responds by summing the API response time calculated in step S403 and the container boot time acquired in step S404 (step S405).

Finally, the event-driven container management program 223 calculates a predicted value (a total API processing time predicted value) of API processing time in all of the containers 228 in the application based on the predicted value of API processing time of the target container that is calculated in step S405, reflects the total API processing time predicted value in a display content on an API processing time display screen displayed on the web browser 122 of the user terminal (step S406), and ends the event-driven container API processing time prediction processing. The API processing time display screen will be described later with reference to FIGS. 23 and 24.

In the present example, processings up to the processing (in step S406) of reflecting, on the API processing time display screen, the predicted value of API processing time in all of the containers 228 in the application are described as a series of processings in the event-driven container API processing time prediction processing, but the event-driven container management program 223 may execute a processing corresponding to the processing in step S406 as an output processing different from the series of processings described above.

(4-5) Container Boot Count Overhead Reduction Processing

Figure 16:
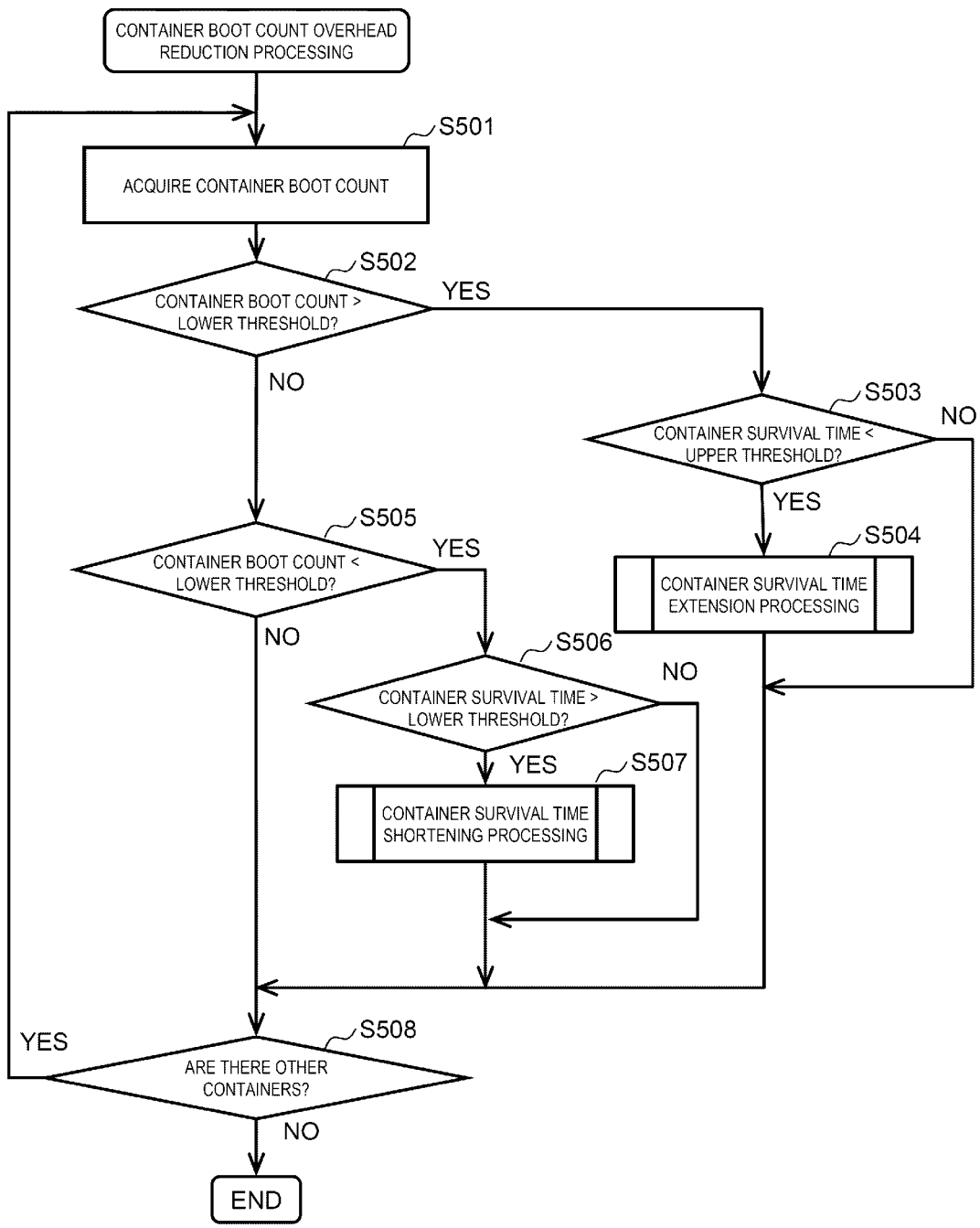
FIG. 16 is a flowchart showing a processing procedure example of a container boot count overhead reduction processing.

FIG. 16 is a flowchart showing a processing procedure example of a container boot count overhead reduction processing.

As described above with reference to FIGS. 13 and 14, the event-driven container is event-driven in response to an event (for example, an API call), and thereafter is deleted when survival time of the event-driven container is elapsed. Therefore, an overhead of the event-driven container occurs each time boot and deletion processings are executed and a total amount of overheads increases corresponding to a boot count. A case is assumed in which, when an event (for example, an API call) occurs for a plurality of times in the same event-driven container in a predetermined period, a total amount of overheads can be reduced by a method of extending the survival time of the event-driven container and maintaining a boot state as compared with a method of repeating boot and deletion of the event-driven container for a plurality of times. On the other hand, a case is assumed in which, when the survival time of the event-driven container is longer than a necessary period, the boot count is reduced, but resources of the container runtime platform 20 are wastefully ensured by uselessly maintaining a boot state of the event-driven container, and therefore it is preferable to shorten the survival time of the event-driven container.

Therefore, in the present embodiment, the event-driven container management program 223 can execute the container boot count overhead reduction processing shown in FIG. 16 in order to reduce the total amount of overheads associated with the boot of the event-driven container. Detailed processing procedure will be described below. In the container boot count overhead reduction processing, the event-driven container management program 223 adjusts a container boot count by extending or shortening the survival time of the event-driven container based on a previous operation history of the event-driven container, and reduces the overheads associated with the boot of the event-driven container in an application. The container boot count overhead reduction processing is executed at any timing (for example, once a day).

In FIG. 16, the processings in steps S501 to S507 are processings related to one event-driven container. The one event-driven container to be processed is determined by the event-driven container management program 223 selecting one container from containers in which "true" is recorded in the event-driven column 2256 of the container table 225.

First, in step S501, the event-driven container management program. 223 acquires a boot count (a container boot count) of the event-driven container to be processed (step S501). The container boot count is acquired targeting in a predetermined period (for example, form when a previous container boot count overhead reduction processing is performed to a current time point). A specific count can be acquired by referring to the event-driven container boot/deletion log file 2320.

Next, the event-driven container management program. 223 determines whether the container boot count acquired in step S501 is larger than a container boot count upper threshold (step S502). The container boot count upper threshold is recorded in the container boot count upper threshold column 2276 of the event-driven container setting table 227. When the container boot count is larger than the container boot count upper threshold in step S502 (YES in step S502), the processing proceeds to step S503, and when the container boot count is equal to or less than the container boot count upper threshold (NO in step S502), the processing proceeds to step S505.

In step S503, the event-driven container management program 223 determines whether the container survival time of the event-driven container to be processed is shorter than a container survival time upper threshold. The container survival time can be acquired by referring to the container survival time column 2257 of the container table 225, and an initial value of the container survival time is recorded in the container survival time initial value column 2271 of the event-driven container setting table 227. The container survival time upper threshold is recorded in the container survival time upper threshold column 2273 of the event-driven container setting table 227.

When the container survival time is shorter than the container survival time upper threshold in step S503 (YES in step S503), the event-driven container management program 223 executes a container survival time extension processing of extending the container survival time (step S504) since there is room for extending the container survival time of the event-driven container to be processed. When the container survival time extension processing is completed, the processing proceeds to step S508. Specific processing procedure of the container survival time extension processing includes a first processing procedure example shown in FIG. 17 and a second processing procedure example shown in FIG. 19, which will be described later.

On the other hand, when the container survival time is equal to or longer than the container survival time upper threshold in step S503 (NO in step S503), the processing proceeds to step S508 without any special processing since the container boot count exceeds an upper threshold, the container survival time also exceeds an upper threshold, and it is not allowed to further extend the container survival time.

In step S505, the event-driven container management program 223 determines whether the container boot count acquired in step S501 is less than the container boot count lower threshold. The container boot count lower threshold is recorded in the container boot count lower threshold column 2275 of the event-driven container setting table 227. When the container boot count is less than the container boot count lower threshold in step S505 (YES in step S505), the processing proceeds to step S506. On the other hand, when the container boot count is equal to or larger than the container boot count lower threshold in step S505 (NO in step S505), the processing proceeds to step S508 without any special processing since the container boot count of the event-driven container to be processed is within an appropriate range.

In step S506, the event-driven container management program 223 determines whether the container survival time of the event-driven container to be processed is larger than a container survival time lower threshold. The container survival time lower threshold is recorded in the container survival time lower threshold column 2272 of the event-driven container setting table 227.

When the container survival time is larger than the container survival time lower threshold in step S506 (YES in step S506), the event-driven container management program. 223 executes a container survival time shortening processing of shortening the container survival time (step S507) since there is room for shortening the container survival time of the event-driven container to be processed. When the container survival time shortening processing is completed, the processing proceeds to step S508. Specific processing procedure of the container survival time shortening processing includes a first processing procedure example shown in FIG. 18 and a second processing procedure example shown in FIG. 20, which will be described later.

On the other hand, when the container survival time is equal to or less than the container survival time lower threshold in step S506 (NO in step S506), the processing proceeds to step S508 without any special processing since the container boot count is less than a lower threshold, the container survival time exceeds a lower threshold, and it is not allowed to further shorten the container survival time.

When the processings in steps S501 to S507 are ended as described above, the event-driven container management program 223 determines whether there are unprocessed event-driven containers (step S508). When there are unprocessed event-driven containers (Yes in step S508), one of the unprocessed event-driven containers is selected as an event-driven container to be processed again, and the processings from step S501 to step S507 are repeated. On the other hand, when there is no unprocessed event-driven container in step S508 (NO in step S508), the container boot count overhead reduction processing is ended since the processings in steps S501 to S507 are completed for all event-driven containers.

Next, two processing procedure examples of each of the container survival time extension processing in step S504 and the container survival time shortening processing in step S507 will be described.

(4-5-1) First Container Survival Time Extension/Shortening Processing

Figure 17:
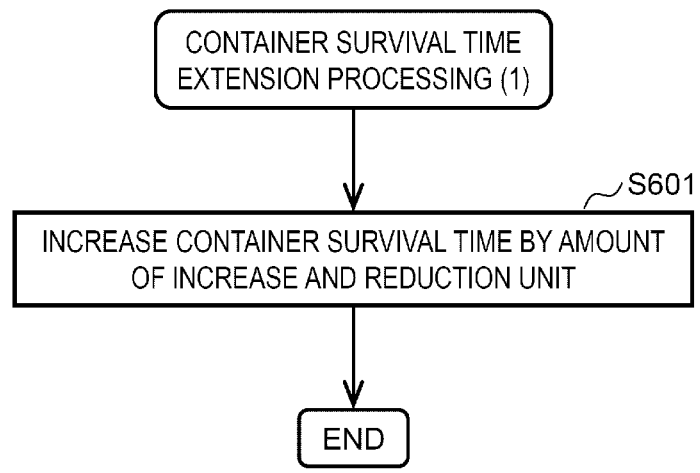
FIG. 17 is a flowchart showing a processing procedure example of a first container survival time extension processing.

FIG. 17 is a flowchart showing a processing procedure example of a first container survival time extension processing. In the first container survival time extension processing shown in FIG. 17, the event-driven container management program 223 increases the container survival time of the event-driven container to be processed by an amount of a container survival time increase and reduction unit (step S601), and then ends the processing.

A value of the container survival time increase and reduction unit is recorded in the container survival time increase and reduction unit column 2274 of the event-driven container setting table 227. In step S601, the event-driven container management program 223 updates a value in the container survival time column 2257 in an entry (an entry having a matched container ID) corresponding to the event-driven container to be processed in the container table 225 to be a value obtained after a value of the container survival time increase and reduction unit is added.

The event-driven container management program 223 can extend the container survival time of the event-driven container to be processed by an amount of one container survival time increase and reduction unit by executing the first container survival time extension processing as described above.

Figure 18:
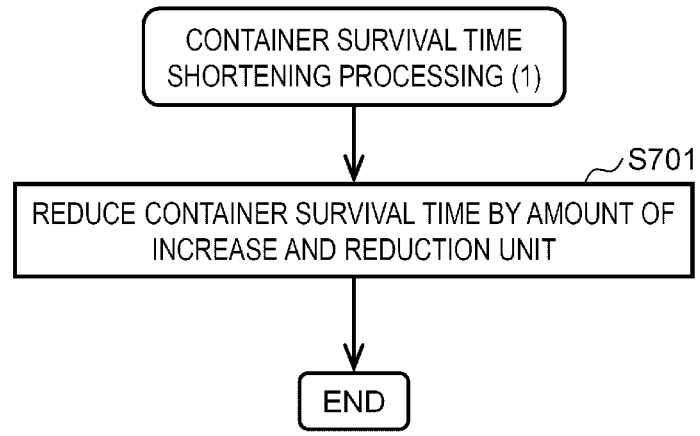
FIG. 18 is a flowchart showing a processing procedure example of a first container survival time shortening processing.

FIG. 18 is a flowchart showing a processing procedure example of a first container survival time shortening processing. In the first container survival time shortening processing shown in FIG. 18, the event-driven container management program 223 reduces the container survival time of the event-driven container to be processed by an amount of the container survival time increase and reduction unit (step S701), and then ends the processing. Specifically, in step S701, the event-driven container management program 223 updates a value in the container survival time column 2257 in an entry (an entry having a matched container ID) corresponding to the event-driven container to be processed in the container table 225 to be a value obtained after a value of the container survival time increase and reduction unit is reduced.

The event-driven container management program 223 can shorten the container survival time of the event-driven container to be processed by an amount of one container survival time increase and reduction unit by executing the first container survival time shortening processing as described above.

(4-5-2) Second Container Survival Time Extension/Shortening Processing

Figure 19:
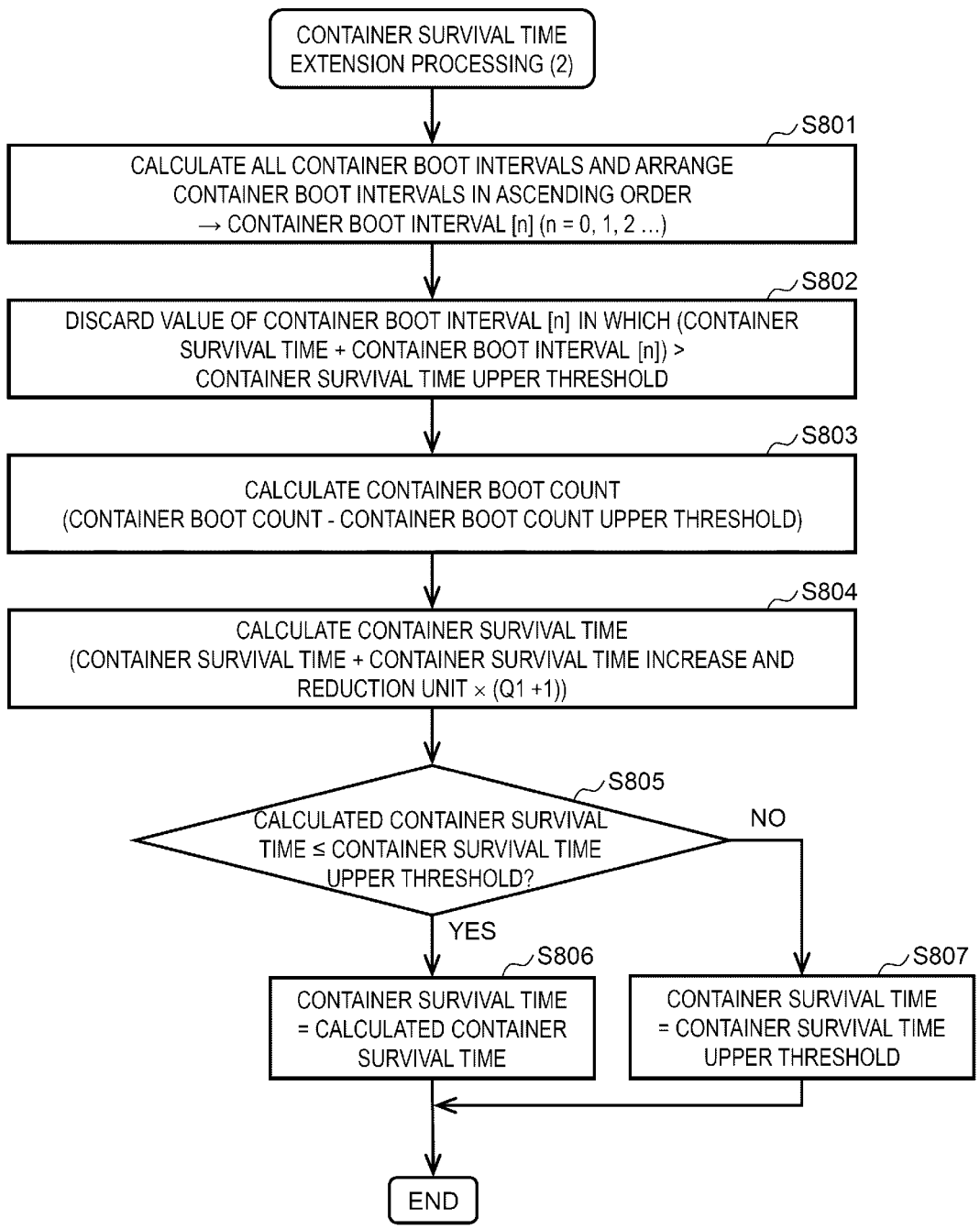
FIG. 19 is a flowchart showing a processing procedure example of a second container survival time extension processing.

FIG. 19 is a flowchart showing a processing procedure example of a second container survival time extension processing. In the second container survival time extension processing shown in FIG. 19, the event-driven container management program 223 determines container survival time so that a container boot count per unit time is equal to or less than the container boot count upper threshold.

According to FIG. 19, first, the event-driven container management program 223 calculates all time (container boot interval) required from a container deletion in the event-driven container to be processed up to a subsequent container boot, and arranges the time in ascending order (step S801). More specifically, the event-driven container management program 223 extracts a log in an entry (an entry having a matched container ID) corresponding to the event-driven container to be processed by referring to the event-driven container boot/deletion log file 2320, sequentially calculates a difference between a time point when a container is deleted and a time point when a subsequent container is booted in time series, and calculated results are arranged in ascending order and then stored in an array "container boot interval [n] (n=0, 1, 2 . . . )".

Next, the event-driven container management program 223 discards an element having a larger value obtained by adding the container survival time with the array "container boot interval [n]" generated in step S801 than the container survival time upper threshold (step S802).

Next, the event-driven container management program 223 calculates a value of a "container boot count" by subtracting the container boot count upper threshold from the container boot count (step S803).

Next, the event-driven container management program 223 calculates a "container survival time" maximum value of container survival time in which a container boot count is maximum within a range equal to or less than the container boot count upper threshold (step S804). Specifically, the "container survival time" is calculated by a calculation of "container survival time+container survival time increase and reduction unit×(Q1+1)". "Q1" corresponds to a quotient of "container boot interval [container boot count+1]/container survival time increase and reduction unit".

Next, the event-driven container management program 223 determines whether the "container survival time" calculated in step S804 is equal to or less than the container survival time upper threshold (step S805). When the "container survival time" is equal to or less than the container survival time upper threshold in step S805, the processing proceeds to step S806, and when the "container survival time" is larger than the container survival time upper threshold, the processing proceeds to step S807.

In step S806, the event-driven container management program. 223 sets a value of the calculated "container survival time" to be the container survival time, and ends the processing.

On the other hand, in step S807, the event-driven container management program 223 sets the container survival time upper threshold to be the container survival time, and ends the processing.

By executing the second container survival time extension processing as described above, the event-driven container management program 223 can extend the container survival time of the event-driven container to be processed to such a value that a container boot count per unit time is maximum within a range equal to or less than the container boot count upper threshold.

Figure 20:
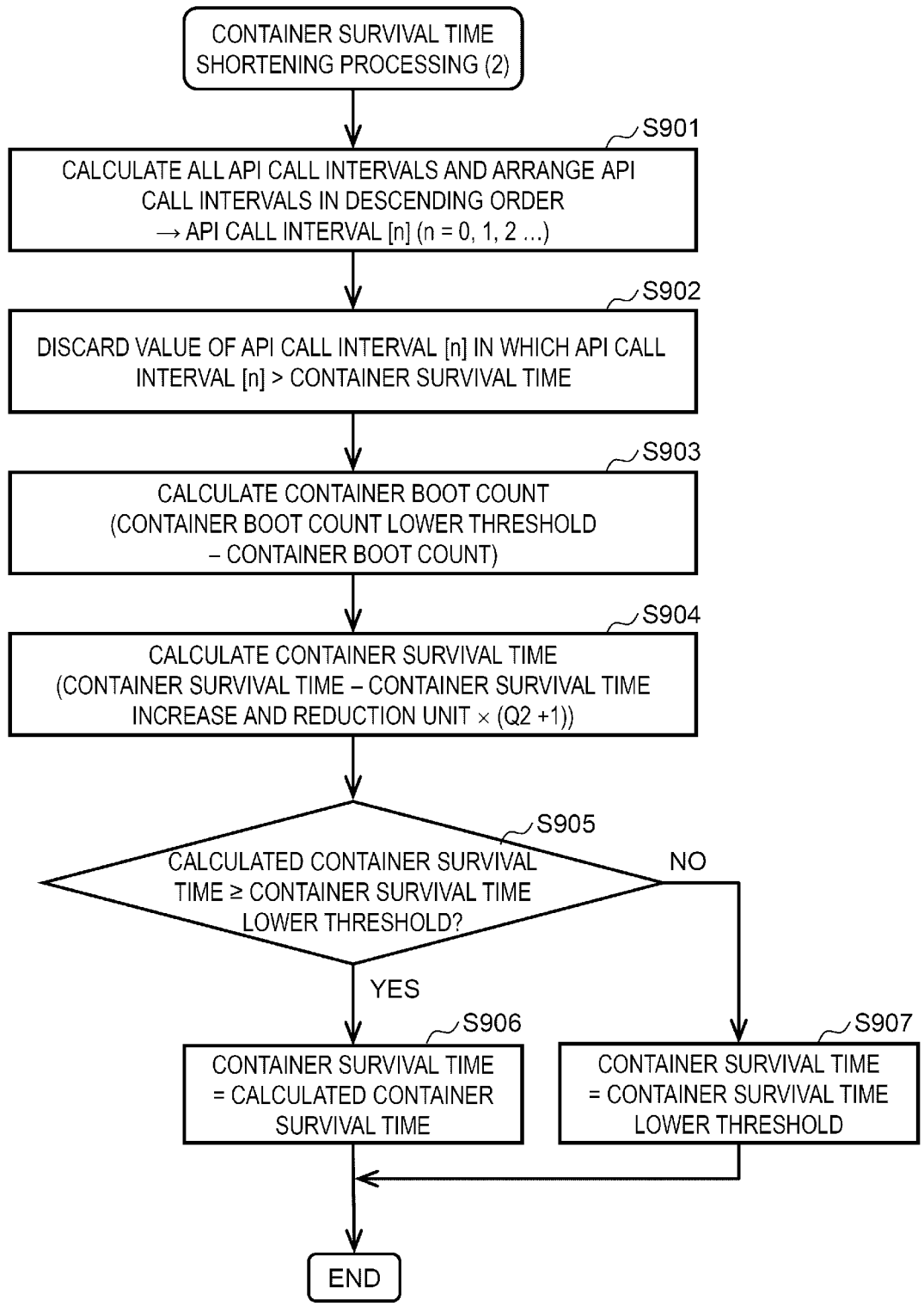
FIG. 20 is a flowchart showing a processing procedure example of a second container survival time shortening processing.

FIG. 20 is a flowchart showing a processing procedure example of a second container survival time shortening processing. In the second container survival time shortening processing shown in FIG. 20, the event-driven container management program 223 determines container survival time so that a container boot count per unit time is equal to or larger than the container boot count lower threshold.

According to FIG. 20, first, the event-driven container management program 223 calculates all time intervals (API call intervals) in which an API is called in the event-driven container to be processed, and arranges the time intervals in descending order (step S901). More specifically, the event-driven container management program 223 extracts a log in an entry (an entry in which a corresponding service ID is recorded) corresponding to the event-driven container to be processed by referring to the container API call log file 2310, sequentially calculates an interval between API call time points of a "request" in time series, and calculated results are arranged in descending order and then stored in an array "API call interval [n] (n=0, 1, 2 . . . )".

Next, the event-driven container management program 223 discards an element exceeding container survival time from the array "API call interval [n]" generated in step S901 (step S902).

Next, the event-driven container management program 223 calculates a value of "container boot count" by subtracting a container boot count from the container boot count lower threshold (step S903).

Next, the event-driven container management program. 223 calculates a "container survival time" minimum value of container survival time in which a container boot count is minimum within a range equal to larger than the container boot count lower threshold (step S904). Specifically, the "container survival time" is calculated by a calculation of "container survival time−container survival time increase and reduction unit×(Q2+1)". "Q2" corresponds to a quotient of "API call interval [container boot count−1]/container survival time increase and reduction unit".

Next, the event-driven container management program. 223 determines whether the "container survival time" calculated in step S904 is equal to or larger than the container survival time lower threshold (step S905). When the "container survival time" is equal to or larger than the container survival time lower threshold in step S905, the processing proceeds to step S906, and when the "container survival time" is less than the container survival time lower threshold, the processing proceeds to step S907.

Further, in step S906, the event-driven container management program 223 sets a value of the calculated "container survival time" to be the container survival time, and ends the processing.

On the other hand, in step S907, the event-driven container management program 223 sets the container survival time lower threshold to be the container survival time, and ends the processing.

By executing the second container survival time shortening processing as described above, the event-driven container management program 223 can shorten the container survival time of the event-driven container to be processed to such a value that a container boot count per unit time is minimum within a range equal to or larger than the container boot count lower threshold.

(4-6) Application Resource Usage Amount Calculation Processing

A unit period memory usage amount calculation processing and a unit period CPU usage amount calculation processing will be described as an example of a processing of calculating, by the application development support system 1 according to the present embodiment, a usage amount of resources (an application resource usage amount) used by a container (including an event-driven container) during execution of an application.

(4-6-1) Unit Period Memory Usage Amount Calculation Processing

Figure 21:
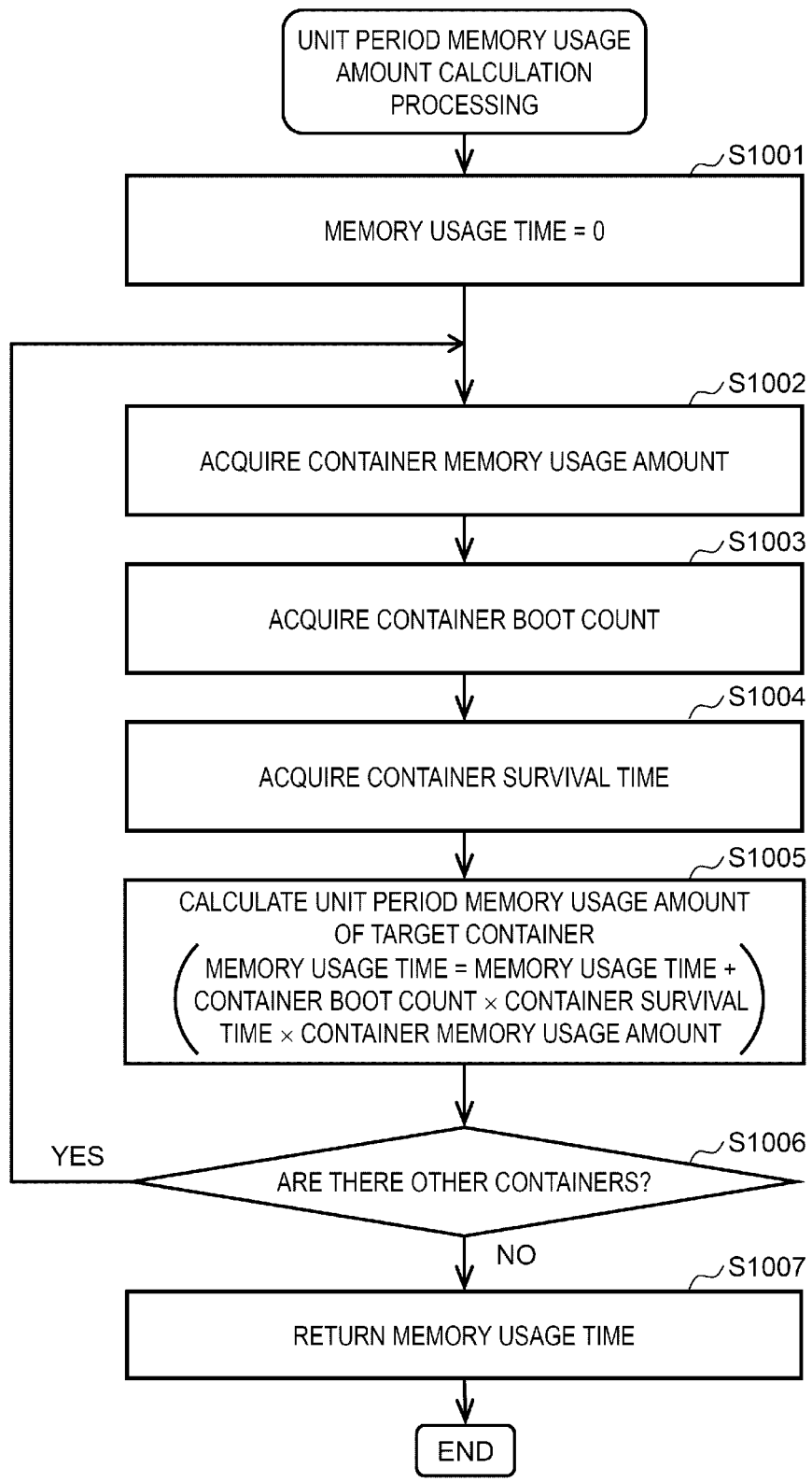
FIG. 21 is a flowchart showing a processing procedure example of a unit period memory usage amount calculation processing.

FIG. 21 is a flowchart showing a processing procedure example of a unit period memory usage amount calculation processing. The unit period memory usage amount calculation processing is a processing of calculating a usage amount (a unit period memory usage amount) of a memory used by an event-driven container per unit period, and is executed by the event-driven container management program 223. Any period (time) can be specified as the unit period, such as an hour, a day, and a week. The event-driven container management program 223 executes the unit period memory usage amount calculation processing in each unit period.

According to FIG. 21, first, the event-driven container management program 223 initializes a variable "memory usage time" used in a calculation of a unit period memory usage amount by substituting "0" into the variable "memory usage time" (step S1001).

Next, the event-driven container management program 223 selects one event-driven container (hereinafter, referred to as a target container) from the containers 228 constituting an execution environment of an application by referring to the container table 225, and acquires a current usage amount (a container memory usage amount) of the memory 22 used by the target container from the OS 221 of the container runtime platform 20 (step S1002).

Next, the event-driven container management program 223 calculates a boot count of the target container in a current unit period by referring to the event-driven container boot/deletion log file 2320 (step S1003).

Next, the event-driven container management program 223 acquires container survival time of the target container by referring to the container table 225 (step S1004).

Next, the event-driven container management program 223 calculates a unit period memory usage amount of the target container, and adds the unit period memory usage amount of the target container to a value of the variable "memory usage time" (step S1005). The unit period memory usage amount of the target container is represented by a product of values (the container boot count, the container survival time, and the container memory usage amount) acquired in steps S1002 to S1004.

Therefore, in step S1005, the event-driven container management program 223 calculates a value of "memory usage time+container boot count×container survival time×container memory usage amount", and substitutes the calculated value into the variable "memory usage time".

Next, the event-driven container management program 223 checks whether there are event-driven containers in which a unit period memory usage amount is not calculated among the containers 228 constituting the execution environment of the application by referring to the container table 225 (step S1006). When there are unprocessed event-driven containers (YES in step S1006), one event-driven container is selected as a subsequent target container, and the processing returns to step S1002 and subsequent steps are repeated. On the other hand, when there is no unprocessed event-driven container in step S1006 (NO in step S1006), the processing proceeds to step S1007.

Further, in step S1007, the event-driven container management program. 223 returns a value of the variable "memory usage time" and ends the processing.

By executing the unit period memory usage amount calculation processing as described above, the unit period memory usage amount of all event-driven containers constituting the execution environment of the application is returned as a value of the "memory usage time".

Then, the event-driven container management program 223 uses the value of the variable "memory usage time" returned in step S1007 by the unit period memory usage amount calculation processing executed in each unit period to execute an output processing of displaying a memory usage amount display screen (which will be described later in FIG. 25) on the web browser 122 of the user terminal 10, so that an application resource usage amount of the memory 22 used, per unit period, by the containers 228 constituting the execution environment of the application can be arranged in time series and presented.

(4-6-2) Unit Period CPU Usage Amount Calculation Processing

Figure 22:
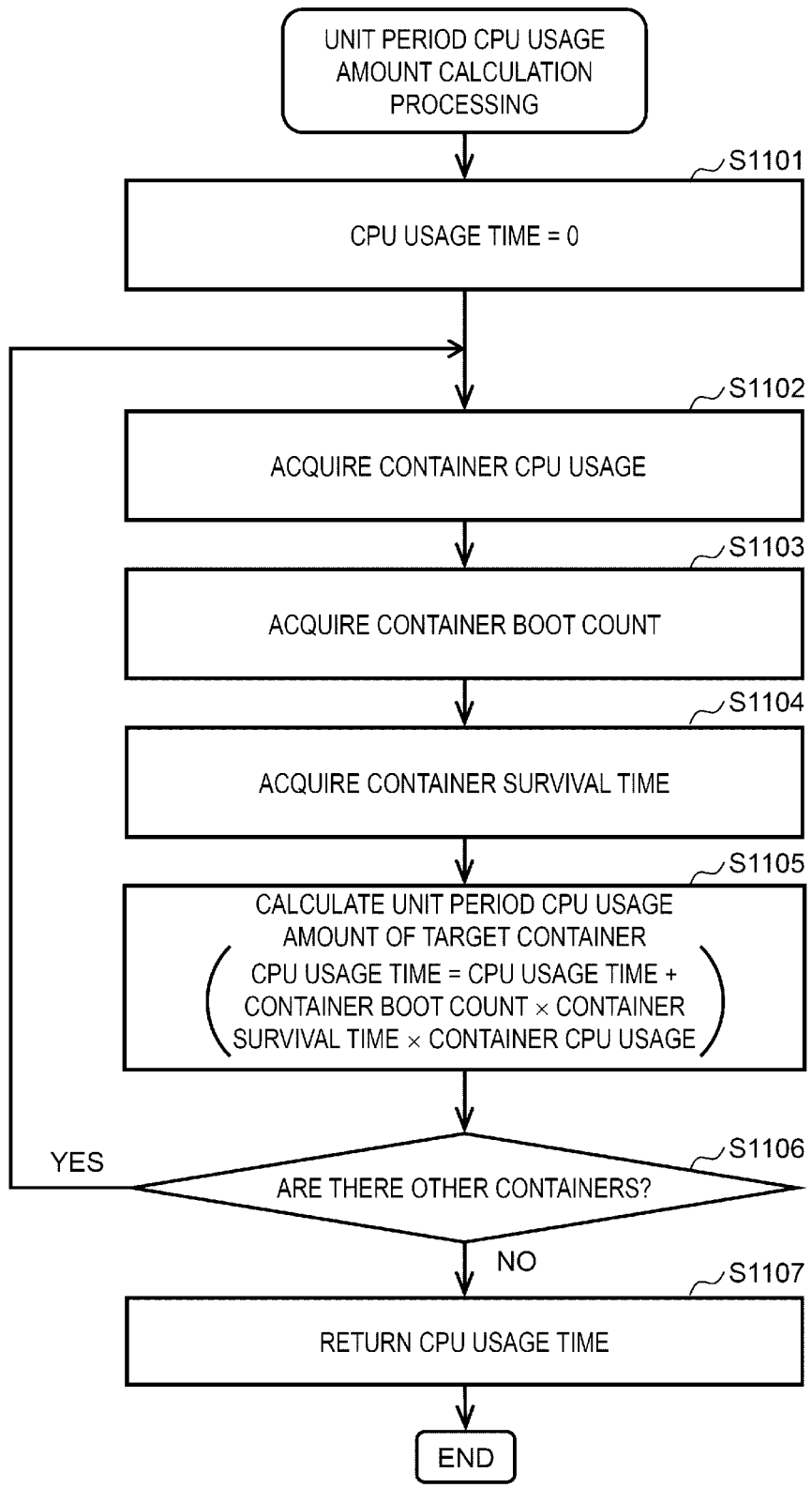
FIG. 22 is a flowchart showing a processing procedure example of a unit period CPU usage amount calculation processing.

FIG. 22 is a flowchart showing a processing procedure example of a unit period CPU usage amount calculation processing. The unit period CPU usage amount calculation processing is a processing of calculating a total usage (a unit period CPU usage amount) of a CPU used by an event-driven container per unit period, and is executed by the event-driven container management program 223. Any period (time) can be specified as the unit period, such as an hour, a day, and a week. The event-driven container management program 223 executes the unit period CPU usage amount calculation processing in each unit period.

According to FIG. 22, first, the event-driven container management program 223 initializes a variable "CPU usage time" used in a calculation of a unit period CPU usage amount by substituting "0" into the variable "CPU usage time" (step S1101).

Next, the event-driven container management program 223 selects one event-driven container (hereinafter, referred to as a target container) from the containers 228 constituting an execution environment of an application by referring to the container table 225, and acquires a current usage (a container CPU usage) of the processor 21 used by the target container from the OS 221 of the container runtime platform 20 (step S1102).

Next, the event-driven container management program 223 calculates a boot count of the target container in a current unit period by referring to the event-driven container boot/deletion log file 2320 (step S1103).

Next, the event-driven container management program. 223 acquires container survival time of the target container by referring to the container table 225 (step S1104).

Next, the event-driven container management program. 223 calculates a unit period CPU usage amount of the target container, and adds the unit period CPU usage amount of the target container to a value of the variable "CPU usage time" (step S1105). The unit period CPU usage amount of the target container is represented by a product of values (the container boot count, the container survival time, and the container CPU usage) acquired in steps S1102 to S1104. Therefore, in step S1105, the event-driven container management program 223 calculates a value of "CPU usage time+container boot count×container survival time×container CPU usage", and substitutes the calculated value into the variable "CPU usage time".

Next, the event-driven container management program. 223 checks whether there are unprocessed event-driven containers in which a unit period CPU usage amount is not calculated among the containers 228 constituting the execution environment of the application by referring to the container table 225 (step S1106). When there are unprocessed event-driven containers (YES in step S1106), one event-driven container is selected as a subsequent target container, and the processing returns to step S1102 and subsequent steps are repeated. On the other hand, when there is no unprocessed event-driven container in step S1106 (NO in step S1106), the processing proceeds to step S1107.

Then, in step S1107, the event-driven container management program 223 returns a value of the variable "CPU usage time" and ends the processing.

By executing the unit period CPU usage amount calculation processing as described above, the unit period CPU usage amount of all event-driven containers constituting the execution environment of the application is returned as a value of the "CPU usage time".

Then, the event-driven container management program 223 uses the value of the variable "CPU usage time" returned in step S1107 by the unit period CPU usage amount calculation processing executed in each unit period to execute an output processing of displaying a CPU usage amount display screen (which will be described later in FIG. 26) on the web browser 122 of the user terminal 10, so that an application resource usage amount of the processor 21 (CPU) used, per unit period, by the containers 228 constituting the execution environment of the application can be arranged in time series and presented.

(5) Display Screen

In the application development support system 1 according to the present embodiment, the user 2 accesses the event-driven container management program 223 on the web browser 122 of the user terminal 10, so that a screen can be displayed on the web browser 122 based on a result of a processing executed by the event-driven container management program 223. Specific examples of such a display screen will be described below.

(5-1) API Processing Time Display Screen

Figure 23:
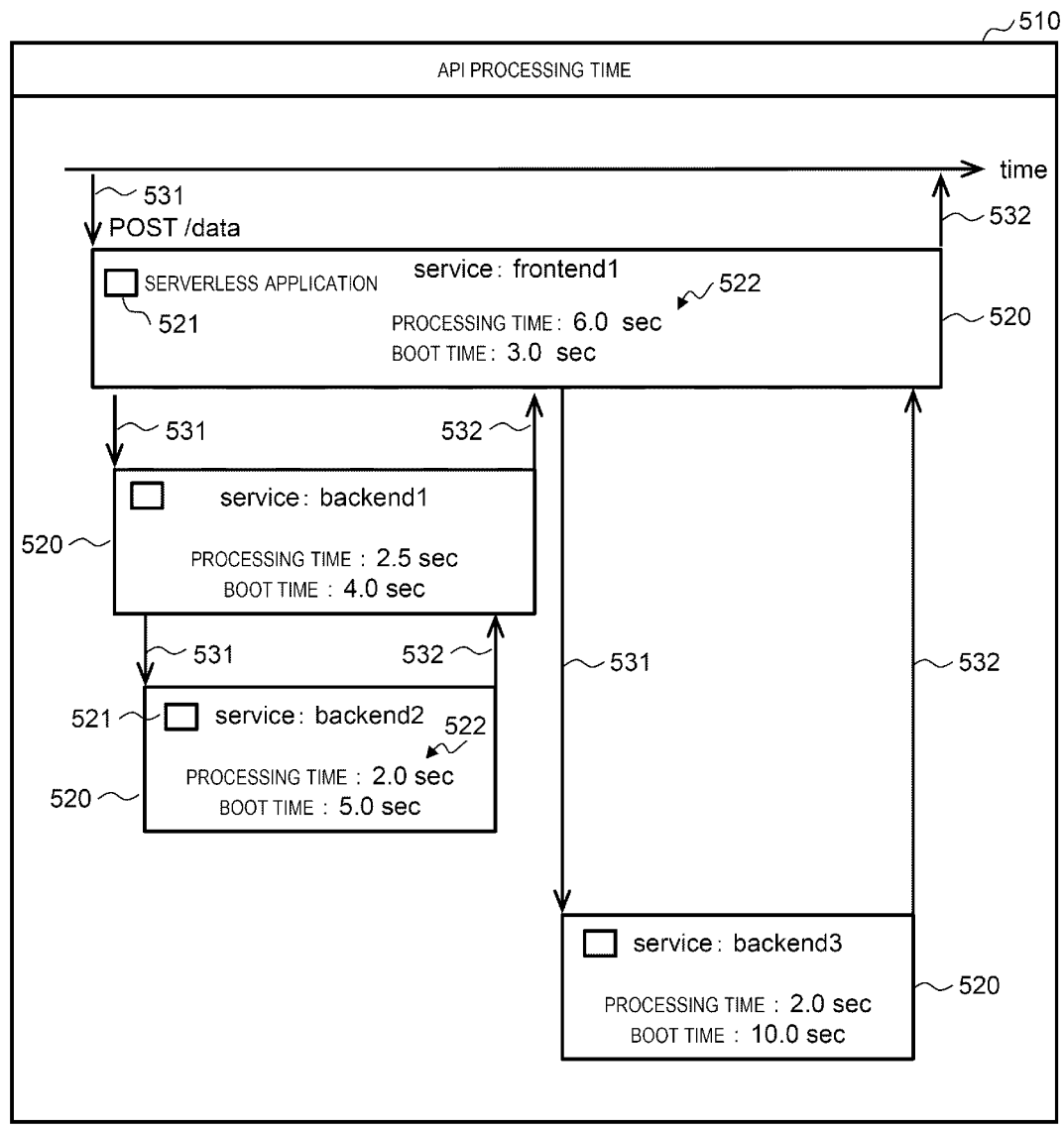
FIG. 23 is a diagram showing a specific example (1) of an API processing time display screen.
Figure 24:
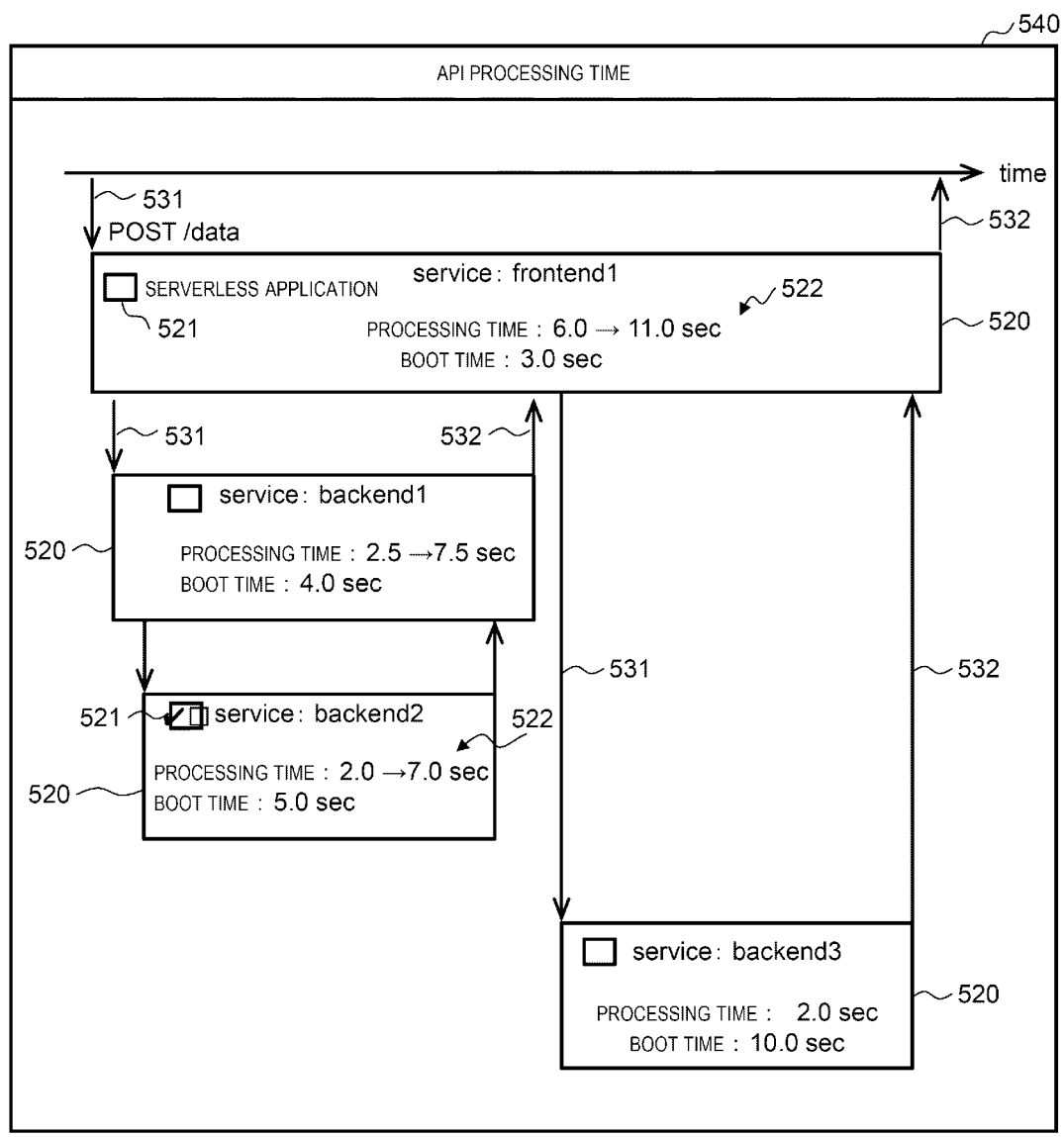
FIG. 24 is a diagram showing a specific example (2) of the API processing time display screen.

FIGS. 23 and 24 are diagrams showing specific examples (1 and 2) of an API processing time display screen. The API processing time display screen shows a relationship diagram of API calls among services (containers) of an application, and is a screen that displays API processing time in each container. On the API processing time display screen, estimated API processing time (a predicted value) when serverless is applied to a certain container can be displayed. In the present example, the application resource configuration example shown in FIG. 11 is used.

An API processing time display screen 510 in FIG. 23 is an example of a display screen when no serverless is applied. When a display configuration of the API processing time display screen 510 (the same applies to an API processing time display screen 540 in FIG. 24) is described, four groups 520 correspond to four services (containers) of a "frontend 1" and a "backend 1" to a "backend 3". Each group 520 includes a checkbox 521 in which whether serverless can be applied can be selected, and a time display 522 showing processing time and boot time in a corresponding service (container). In the time display 522, the "processing time" refers to time (API processing time) required from when a target container receives an API request to when the target container returns a response, and the "boot time" refers to time required for booting the target container. Communications 531 and 532 shows transmission and reception between groups 520 correspondingly to a time axis in a horizontal direction ("time" shown in the figure).

Here, in FIG. 23, since the checkbox 521 is not checked in any of the groups 520, all of the containers 228 are in a non-serverless application state. In this case, the container 228 in each group 520 is in a constant boot state, and the boot time shown in the time display 522 has no influence on the actual API processing time. For example, the "frontend 1" which is a frontend of an API call from outside in the group 520 (container) returns a response at 6 seconds after an API request is received.

On the other hand, when serverless is applied to one or more containers 228, since an event-driven container can return an API response after the event-driven container is booted by event driving, boot time of the event-driven container is added to a predicted value of API processing time. The API processing time display screen 540 in FIG. 24 is an example of a display screen reflecting a predicted value when such a serverless application is assumed. Specifically, the API processing time display screen 540 in FIG. 24 reflects estimated API processing time (a predicted value) when the checkbox 521 in the group 520 of the "backend 2" is checked (that is, when serverless is applied to the container 228c of the "backend 2" shown in FIG. 11).

In this case, when the checkbox 521 on the API processing time display screen 540 is checked on the web browser 122, the event-driven container management program 223 executes the event-driven container API processing time prediction processing as described above (see FIG. 15). In step S405 of the event-driven container API processing time prediction processing, boot time by event driving of "5.0 seconds" is added to processing time of "2.0 seconds" during non-serverless application in the target container (the "backend 2"), and a predicted value of "7.0 seconds" of API processing time of the target container is calculated. Then, in step S406, a predicted value of all API processing time of "11.0 seconds" is calculated by adding the "boot time by event driving of '5.0 seconds'" to processing time of "6.0 seconds" in the "frontend 1".

The calculated values described above are reflected on the API processing time display screen 540. Specifically, processing time in the group 520 of the "backend 2" is shown as "2.0 sec->7.0 sec" and processing time in the group 520 of the "frontend 1" is shown as "6.0 sec->11.0 sec". As a result, when serverless is applied to the container 228c of the "backend 2", a predicted value can be checked by referring to the API processing time display screen 540 on which API processing time in the entire application is increased by 5.0 seconds so that the API processing time in the entire application is 11.0 seconds.

When an API call sequence in the resource configuration in FIG. 11 is considered, since the container 228b of the "backend 1" is interposed between the container 228c of the "backend 2" and the container 228a of the "frontend 1", when serverless is applied to the container 228c of the "backend 2", boot time of the container 228c of the "backend 2" also influences processing time of the container 228b of the "backend 1". Therefore, on the API processing time display screen 540, the processing time of the group 520 of the "backend 1" is also increased by 5.0 seconds similarly to the processing of the group 520 of the "frontend 1", and is shown as "2.5 sec->7.5 sec". On the other hand, since the group 520 of "the backend 3" does not directly communicate with the group of the "backend 2", processing time is not changed.

As described above, in the present embodiment, when a candidate container to which serverless is applied is selected on the API processing time display screen 510, the event-driven container API processing time prediction processing is executed for the selected container, and a calculated predicted value of the API processing time of an event-driven container is reflected in processing time of each container in consideration of an API call sequence between containers. Therefore, the user 2 can check estimated API processing time of the entire containers when serverless is applied by selecting a certain container (the checkbox 521 of the group 520) on the API processing time display screen 510, and can study a suitable combination of containers 228 to which serverless is applied.

(5-2) Application Resource Usage Amount Display Screen

Next, a display screen showing a calculated usage amount (an application resource usage amount) of resources used by the containers 228 constituting an execution environment of an application will be described.

Figure 25:
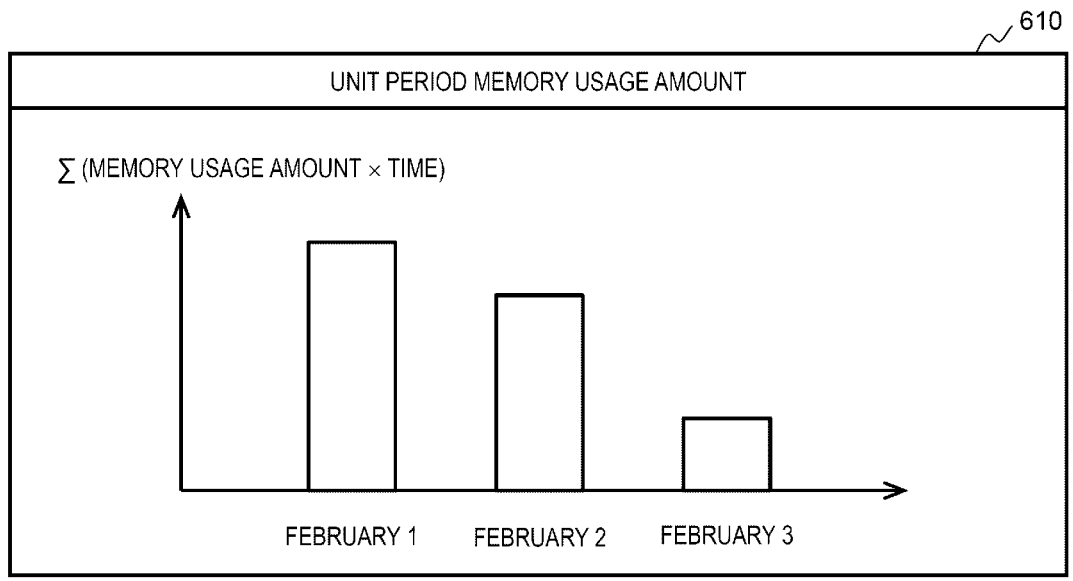
FIG. 25 is a diagram showing an example of a memory usage amount display screen.

FIG. 25 is a diagram showing an example of a memory usage amount display screen. The memory usage amount display screen is an example of an application resource usage amount display screen, and is a screen that displays, in time series, usage amounts (unit period memory usage amounts) of the memory 22 of the container runtime platform 20 used per unit period by the containers 228 constituting the execution environment of the application. The unit period in the present example is one day.

In FIG. 25, the memory usage amount display screen 610 displays a total memory usage amount over time (a unit period memory usage amount) in all containers 228 of the application. The user 2 can call the memory usage amount display screen 610 on the web browser 122 by performing a predetermined operation on the web browser 122 of the user terminal 10 and accessing the event-driven container management program 223. In this case, the event-driven container management program 223 can display the memory usage amount display screen 610 on the web browser 122 by arranging and displaying, in time series, the "memory usage time" values returned by the unit period memory usage amount calculation processing (see FIG. 21) executed regularly by the event-driven container management program 223 in each unit period corresponding to execution timing of the unit period memory usage amount calculation processing.

An example of using such a memory usage amount display screen 610 includes checking how a memory usage amount changes after serverless is applied to a certain the containers 228, for example, in consideration of a display of a predicted value of API processing time on the API processing time display screens 510 and 540.

Figure 26:
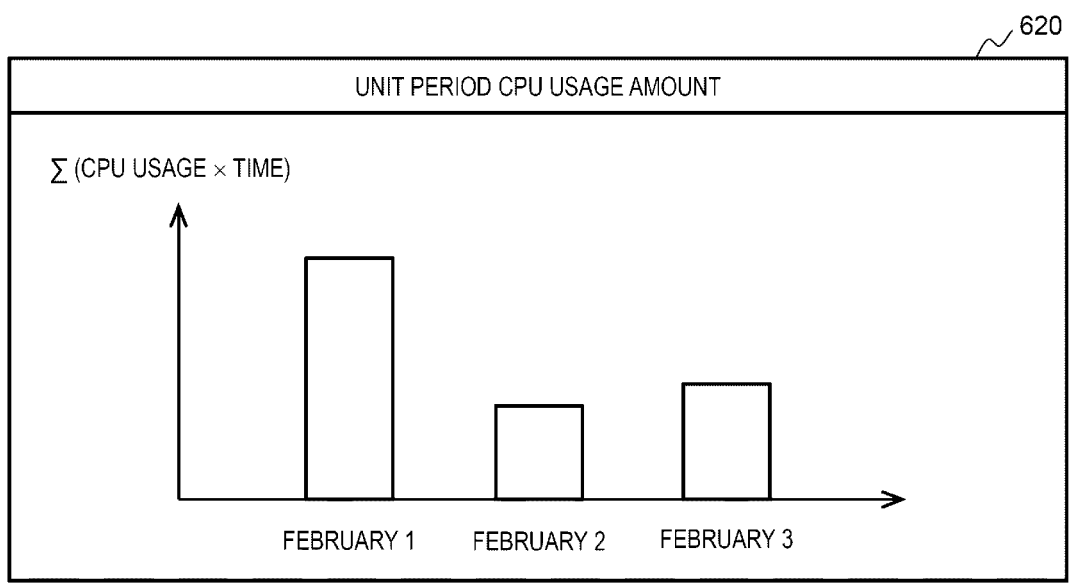
FIG. 26 is a diagram showing an example of a CPU usage amount display screen.

FIG. 26 is a diagram showing an example of a CPU usage amount display screen. The CPU usage amount display screen is an example of an application resource usage amount display screen, and is a screen that displays, in time series, a total amount of usages (unit period CPU usage amount) of the CPU 21 of the container runtime platform 20 used per unit period (unit period CPU usage amounts) by the containers 228 constituting the execution environment of the application. The unit period in the present example is one day.

In FIG. 26, the CPU usage amount display screen 620 displays, in unit of a day, a total amount of CPU usages over time (a unit period CPU usage amount) in all containers 228 of the application. The user 2 can call the CPU usage amount display screen 620 on the web browser 122 by performing a predetermined operation on the web browser 122 of the user terminal 10 and accessing the event-driven container management program 223. In this case, the event-driven container management program 223 can display the CPU usage amount display screen 620 on the web browser 122 by arranging and displaying, in time series, the "CPU usage time" values returned by the unit period CPU usage amount calculation processing (see FIG. 22) executed regularly by the event-driven container management program 223 in each unit period corresponding to execution timing of the unit period CPU usage amount calculation processing.

An example of using such a CPU usage amount display screen 620 includes checking how a CPU usage amount (CPU usage) changes after serverless is applied to a certain container 228, for example, in consideration of a display of a predicted value of API processing time on the API processing time display screens 510 and 540.

As described above, in development of an application configured with microservices, the application development support system 1 according to the present embodiment can apply serverless to at least a part of containers provided as an execution environment of the application and can estimate a change in API response performance (API processing time) when serverless is applied to the containers according to a display on the API processing time display screen 540 using an execution result of the event-driven container API processing time prediction processing, and further, can check a change in a resource usage amount after serverless is applied to the containers according to a display on the memory usage amount display screen 610 using an execution result of the unit period memory usage amount calculation processing or a display on the CPU usage amount display screen 620 using an execution result of the unit period CPU usage amount calculation processing. In this manner, the application development support system 1 according to the present embodiment can support studies on whether serverless can be applied while considering maintaining API response performance and optimizing an application resource usage amount.

The application development support system 1 according to the present embodiment can adjust a boot count of an event-driven container so as to reduce a total amount of overheads accompanying with boot of the event-driven container by executing the container boot count overhead reduction processing in which survival time of the event-driven container is extended or shortened based on a previous operation history in the event-driven container. In this manner, the application development support system 1 according to the present embodiment can obtain an effect of appropriately balancing between reduction in overheads accompanying with boot of the event-driven container and reduction in resource usage amounts accompanying with maintaining a boot state of the event-driven container.

The invention is not limited to the embodiments described above, and includes various modifications. For example, the embodiments described above are described in detail for easy understanding of the invention, and the invention is not necessarily limited to those including all configurations described above. Apart of configurations in each embodiment can be added to, deleted from, or replaced with another configuration.

Control lines or information lines in the drawings indicate what is considered necessary for explanation, and not all of the control lines or information lines are necessarily shown in a product. In practice, it may be considered that almost all of the configurations are connected with each other.

What is claimed is:

1. An application development support system that supports development of application software configured with a plurality of containers in a system that executes the application software, the application development support system comprising:
    a container runtime platform that provides resources for the plurality of containers and has a function of applying serverless to a certain container of the plurality of containers to form an event-driven container, wherein
    a processor of the container runtime platform executes a program so as to perform:
        an API processing time prediction processing of calculating a predicted value of API processing time required from when the event-driven container receives an API call to when the event-driven container responds with an API response, and calculating a predicted value of API processing time in all of the plurality of containers based on the calculated predicted value and a sequence of API calls among the plurality of containers;
        a resource usage amount calculation processing of calculating a usage amount of resources used by the plurality of containers per predetermined unit period;
        an API processing time output processing of outputting the predicted value of API processing time in all of the plurality of containers that is calculated by the API processing time prediction processing, and
        a resource usage amount output processing of outputting the usage amount of the resources used by the plurality of containers that is calculated by the resource usage amount calculation processing.

2. The application development support system according to claim 1, wherein
    the container runtime platform
        executes, when a candidate container to which serverless is to be applied is selected from the plurality of containers, the API processing time prediction processing using the selected container as the event-driven container, and
        outputs information indicating the sequence of API calls among the plurality of containers, and the predicted value of API processing time in all of the plurality of containers in the API processing time output processing.

3. The application development support system according to claim 1, wherein
    the container runtime platform
        executes the resource usage amount calculation processing in each predetermined unit period before and after serverless is applied to a certain container of the plurality of containers, and
        arranges and outputs, in time series, resource usage amounts calculated by a plurality of times of the resource usage amount calculation processing in the resource usage amount output processing.

4. The application development support system according to claim 1, wherein
    a resource whose usage amount is calculated in the resource usage amount calculation processing includes at least one of (1) a memory and (2) a processor in the container runtime platform.

5. The application development support system according to claim 1, wherein
    the processor executes a program, thereby the container runtime platform
        executing a container boot count overhead reduction processing of adjusting survival time of the event-driven container so as to reduce a total amount of overheads accompanying with boot of the event-driven container based on an operation history of the event-driven container.

6. The application development support system according to claim 5, wherein
    in the container boot count overhead reduction processing,
    the survival time of the event-driven container is extended when, in a predetermined period, a boot count of the event-driven container exceeds a predetermined upper threshold and the survival time of the event-driven container is less than a predetermined upper threshold, and
    the survival time of the event-driven container is shortened when, in a predetermined period, the boot count of the event-driven container is less than a predetermined lower threshold and the survival time of the event-driven container is larger than a predetermined lower threshold.

7. The application development support system according to claim 5, wherein
    when the survival time of the event-driven container is extended in the container boot count overhead reduction processing, extension time of the survival time is determined based on a boot interval required from when a container is deleted to when a subsequent container is booted in an operation history of the event-driven container.

8. The application development support system according to claim 5, wherein
    when the survival time of the event-driven container is shortened in the container boot count overhead reduction processing, shortening time of the survival time is determined based on an interval in which an API is called in an operation history of the event-driven container.

9. The application development support system according to claim 5, wherein
    when the survival time of the event-driven container is extended or shortened in the container boot count overhead reduction processing, extension time or shortening time of the survival time is determined using predetermined unit time.

10. An application development support method for a system that executes application software configured with a plurality of containers, the system including a container runtime platform that provides resources for the plurality of containers and has a function of applying serverless to a certain container of the plurality of containers to form an event-driven container, the application development support method comprising:
an API processing time prediction step of calculating a predicted value of API processing time required from when the event-driven container receives an API call to when the event-driven container responds with an API response, and calculating a predicted value of API processing time in all of the plurality of containers based on the calculated predicted value and a sequence of API calls among the plurality of containers;

a resource usage amount calculation step of calculating a usage amount of resources used by the plurality of containers per predetermined unit period;

an API processing time output step of outputting the predicted value of API processing time in all of the plurality of containers that is calculated in the API processing time prediction step; and a resource usage amount output step of outputting the usage amount of the resources used by the plurality of containers that is calculated in the resource usage amount calculation step.

* * * * *